United States Patent
Kim et al.

(10) Patent No.: US 12,477,429 B2
(45) Date of Patent: Nov. 18, 2025

(54) ELECTRONIC DEVICE FOR PROVIDING CALL FUNCTION AND OPERATING METHOD THEREOF

(71) Applicant: SAMSUNG ELECTRONICS CO., LTD., Suwon-si (KR)

(72) Inventors: Dongho Kim, Suwon-si (KR); Kirak Bae, Suwon-si (KR); Injae Song, Suwon-si (KR); Soomin Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 496 days.

(21) Appl. No.: 17/835,987

(22) Filed: Jun. 9, 2022

(65) Prior Publication Data
US 2023/0055451 A1 Feb. 23, 2023

Related U.S. Application Data

(63) Continuation of application No. PCT/KR2022/006809, filed on May 12, 2022.

(30) Foreign Application Priority Data

Aug. 20, 2021 (KR) .......................... 10-2021-0109993

(51) Int. Cl.
*H04W 60/06* (2009.01)
*H04L 65/1016* (2022.01)
(Continued)

(52) U.S. Cl.
CPC ....... *H04W 36/305* (2018.08); *H04L 65/1016* (2013.01); *H04L 65/1069* (2013.01);
(Continued)

(58) Field of Classification Search
CPC ... H04W 84/12; H04W 60/005; H04W 12/06; H04W 36/14; H04W 4/90;
(Continued)

(56) References Cited

U.S. PATENT DOCUMENTS 9,867,098 B2 1/2018 Kwok et al.
10,623,955 B2 4/2020 Zalzalah et al.
(Continued)

FOREIGN PATENT DOCUMENTS

CN 112752314 B 6/2022
KR 10-2002-0079726 A 10/2002
(Continued)

OTHER PUBLICATIONS

International Search Report mailed Aug. 10, 2022 for PCT/KR2022/006809, citing the above reference(s).

*Primary Examiner* — Marcus Smith
*Assistant Examiner* — Jason A Harley
(74) *Attorney, Agent, or Firm* — CANTOR COLBURN LLP

(57) ABSTRACT

Various embodiments of the disclosure relate to an apparatus and method for providing a call function in an electronic device. The electronic device includes first communication circuitry, second communication circuitry, and a processor. The processor registers with a network using NR communication through the first communication circuitry, identifies whether a call connection using a network using the wireless LAN communication is possible, based on determination that establishment of a communication link related to a call connection with an external electronic device using the network using the NR communication and/or a network using LTE communication fails, and connects a call with the external electronic device over the network using the wireless LAN communication, based on determination that the (Continued)

call connection using the network using the wireless LAN communication is possible. Other embodiments may be possible.

13 Claims, 16 Drawing Sheets

(51) Int. Cl.
*H04L 65/1069* (2022.01)
*H04W 36/00* (2009.01)
*H04W 36/14* (2009.01)
*H04W 36/30* (2009.01)
*H04W 60/04* (2009.01)
*H04W 76/18* (2018.01)
*H04W 76/32* (2018.01)
*H04W 76/50* (2018.01)
*H04W 84/12* (2009.01)

(52) U.S. Cl.
CPC ..... *H04W 36/00226* (2023.05); *H04W 60/04* (2013.01); *H04W 76/18* (2018.02); *H04W 84/12* (2013.01)

(58) Field of Classification Search
CPC ............ H04L 65/1016; H04L 65/1073; H04L 65/1104; H04L 2209/80
USPC .................................................. 370/331, 252
See application file for complete search history.

(56) References Cited

U.S. PATENT DOCUMENTS

| | | |
|---|---|---|
| 2002/0085516 A1 | 7/2002 | Bridgelall |
| 2008/0125128 A1 | 5/2008 | Yoo et al. |
| 2014/0176659 A1 | 6/2014 | Khay-Ibbat et al. |
| 2017/0006514 A1* | 1/2017 | Kiss ................. H04W 36/1446 |
| 2017/0289883 A1* | 10/2017 | Kiss ...................... H04W 76/12 |
| 2019/0350044 A1* | 11/2019 | Belghoul ................ H04W 8/08 |
| 2020/0267618 A1 | 8/2020 | Kye et al. |
| 2020/0275331 A1* | 8/2020 | Kim ...................... H04W 60/00 |
| 2021/0014932 A1* | 1/2021 | Mbonye ................ H04W 80/10 |
| 2021/0051530 A1* | 2/2021 | Venkataraman ...... H04W 76/12 |
| 2021/0112469 A1* | 4/2021 | Peng ................. H04W 36/0061 |
| 2021/0136636 A1 | 5/2021 | Zhu et al. |
| 2021/0136645 A1* | 5/2021 | Zhao ..................... H04W 36/30 |
| 2023/0086087 A1* | 3/2023 | Shen ................... H04W 76/18 370/328 |
| 2023/0239952 A1* | 7/2023 | Shi .................. H04W 36/00226 370/329 |

FOREIGN PATENT DOCUMENTS

| | | |
|---|---|---|
| KR | 10-2008-0048119 A | 6/2008 |
| KR | 10-2013-0119123 A | 10/2013 |
| KR | 10-2020-0099735 A | 8/2020 |
| WO | 2021157767 A1 | 8/2021 |

* cited by examiner

ELECTRONIC DEVICE FOR PROVIDING CALL FUNCTION AND OPERATING METHOD THEREOF

CROSS-REFERENCE TO RELATED APPLICATION(S)

This application is a continuation application, claiming priority under § 365(c), of an International application No. PCT/KR2022/006809, filed on May 12, 2022, which is based on and claims the benefit of a Korean patent application number 10-2021-0109993, filed on Aug. 20, 2021, in the Korean Intellectual Property Office, the disclosure of each of which is incorporated by reference herein in its entirety.

TECHNICAL FIELD

Various embodiments of the disclosure relate to an apparatus and method for providing a call function in an electronic device.

BACKGROUND ART

In order to satisfy wireless data traffic demands that tend to increase after 4G communication system commercialization, efforts to develop an enhanced 5G communication system or pre-5G communication system are being made. For this reason, the 5G communication system or the pre-5G communication system is called a beyond 4G network communication system or a post long term evolution (LTE) communication system. In order to achieve a high data transfer rate, an implementation of the 5G communication system in a band of 6 Giga hertz (GHz) or less (e.g., about 1.8 GHz or about 3.5 GHz) or a higher frequency band (e.g., about 28 GHz or about 39 GHz) is taken into consideration. In order to reduce a path loss of a radio wave and increase the transfer distance of a radio wave, beamforming, massive multiple-input and multiple-output (MIMO), full dimensional MIMO (FD-MIMO), an array antenna, analog beamforming and large scale antenna technologies are being discussed in the 5G communication system.

DISCLOSURE

Technical Problem

An electronic device may resister with a network having a stand-alone (SA) structure and using a 5G communication method (e.g., new radio (NR) communication). When a network using a 5G communication method does not support a call function (e.g., Voice over New Radio (VoNR)), the electronic device may be registered with a network using a 4G communication method (e.g., LTE communication) based on evolved packet system (EPS) fallback, and may provide a call function (e.g., voice of LTE (VoLTE)) with an external electronic device.

However, when the electronic device fails in the registration with the network using the 4G communication method based on the EPS fallback, the call connection with the external electronic device may be disconnected or delayed.

Various embodiments of the disclosure disclose an apparatus and method for providing, by an electronic device, a call function with an external electronic device.

Technical Solution

According to various embodiments, an electronic device includes first communication circuitry, which supports new radio (NR) communication and/or long term evolution (LTE) communication; second communication circuitry, which supports wireless LAN communication; and at least one processor operatively connected to the first communication circuitry and the second communication circuitry. The processor registers with a network using the NR communication through the first communication circuitry, identifies whether a call connection using a network using the wireless LAN communication is possible, based on determination that establishment of a communication link related to a call connection with an external electronic device using the network using the NR communication and/or a network using the LTE communication fails, and connects a call with the external electronic device over the network using the wireless LAN communication, based on determination that the call connection using the network using the wireless LAN communication is possible.

According to various embodiments, an operating method of an electronic device includes: registering with a network using new radio (NR) communication; identifying whether a call connection using a network using the wireless LAN communication is possible, based on determination that establishment of a communication link related to a call connection with an external electronic device using the network using the NR communication and/or a network using the LTE communication fails; and connecting a call with the external electronic device over the network using the wireless LAN communication, based on determination that the call connection using the network using the wireless LAN communication is possible.

MODE FOR DISCLOSURE

Hereinafter, various embodiments will be described in detail with reference to attached drawings.

Figure 1:
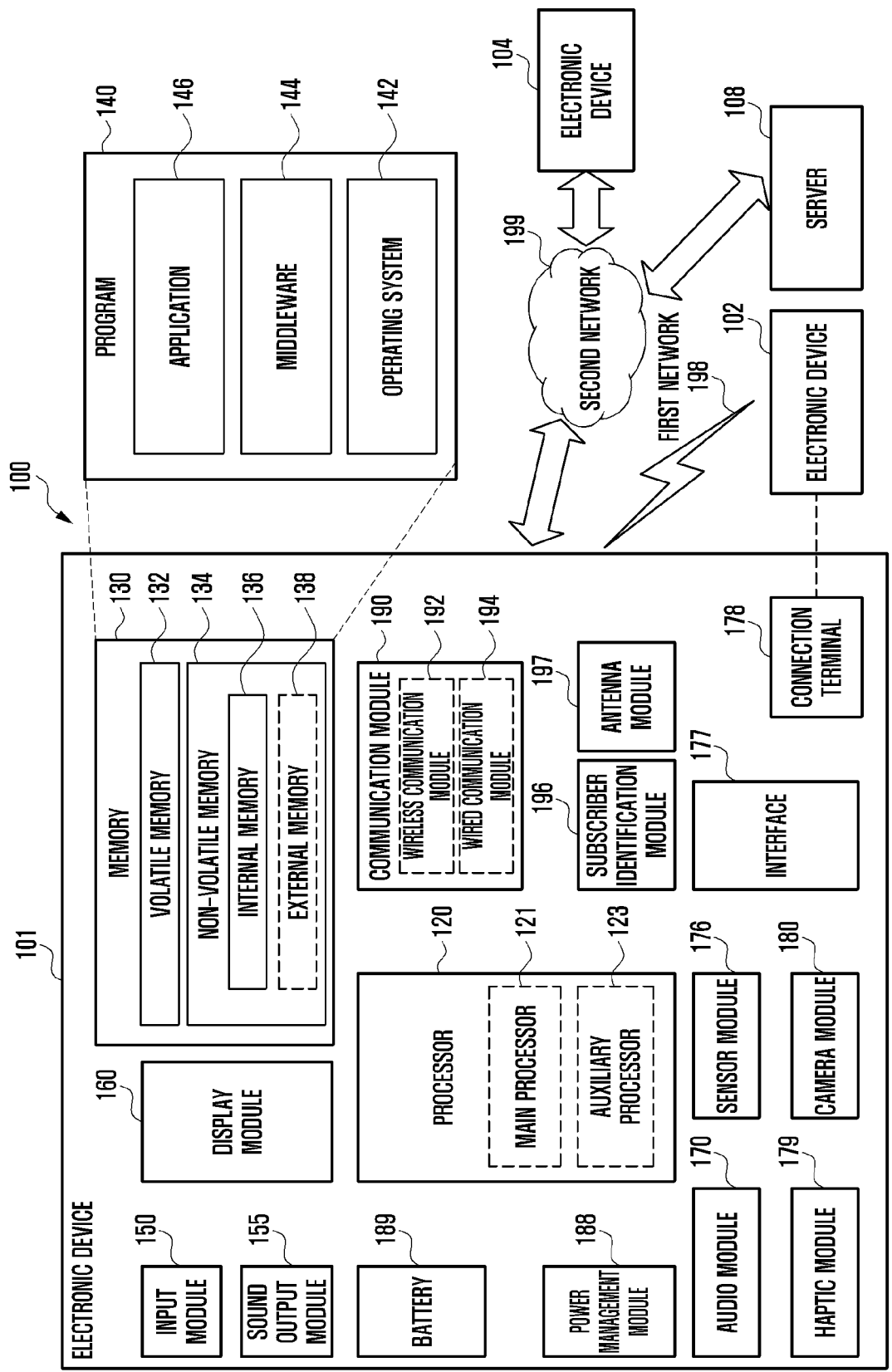
FIG. 1 is a block diagram of an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
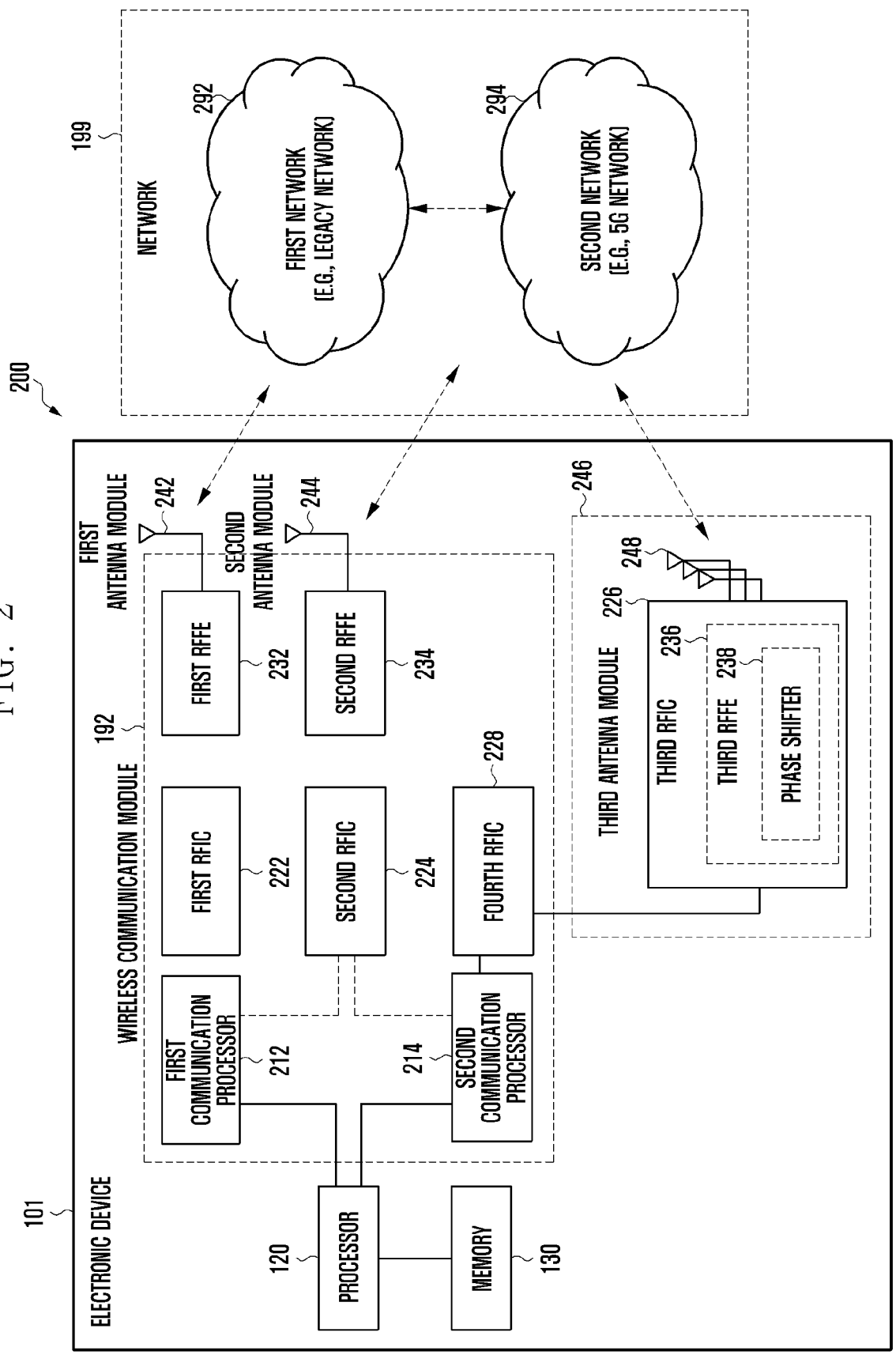
FIG. 2 is a block diagram of an electronic device for supporting legacy network communication and 5G network communication according to various embodiments.

FIG. 2 is a block diagram 200 of the electronic device 101 for supporting legacy network communication and 5G network communication according to various embodiments.

Referring to FIG. 2, according to various embodiments, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may include the processor 120 and the memory 130. The network 199 may include a first network 292 and a second network 294. According to another embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the wireless communication module 192. According to another embodiment, the fourth RFIC 228 may be omitted, or may be included as a part of the third RFIC 226.

The first communication processor 212 may establish a communication channel of a band to be used for wireless communication with the first network 292, and may support legacy network communication via the established communication channel. According to an embodiment, the first network may be a legacy network including second generation (2G), third generation (3G), fourth generation (4G), or long-term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established communication channel. According to an embodiment, the second network 294 may be a 5G network (e.g., new radio (NR)) defined in 3GPP. In addition, according to an embodiment, the first communication processor 212 or the second communication processor 214 may establish a communication channel corresponding to another designated band (e.g., approximately 6 GHz or less) among bands to be used for wireless communication with the second network 294, and may support 5G network communication via the established communication channel. According to an embodiment, the first communication processor 212 and the second communication processor 214 may be implemented in a single chip or a single package. According to an embodiment, the first communication processor 212 or the second communication processor 214 may be implemented in a single chip or a single package, together with the processor 120, the subprocessor 123, or the communication module 190.

According to an embodiment, the first communication processor 212 may perform data transmission or reception with the second communication processor 214. For example, data which has been classified to be transmitted via the second network 294 may be changed to be transmitted via the first network 292.

In this instance, the first communication processor 212 may receive transmission data from the second communication processor 214. For example, the first communication processor 212 may perform data transmission or reception with the second communication processor 214 via an inter-processor interface. The inter-processor interface may be implemented as, for example, a universal asynchronous receiver/transmitter (UART) (e.g., a high speed-UART (HS-UART)) or a peripheral component interconnect bus express (PCIe), but the type of interface is not limited thereto. For example, the first communication processor 212 and the second communication processor 214 may exchange control information and packet data information using, for example, a shared memory. For example, the first communication processor 212 may perform transmission or reception of various types of information such as sensing information, information associated with an output strength, and resource block (RB) allocation information, with the second communication processor 214.

Depending on implementation, the first communication processor 212 may not be directly connected to the second communication processor 214. In this instance, the first communication processor 212 may perform data transmission or reception with the second communication processor 214, via the processor 120 (e.g., an application processor). For example, the first communication processor 212 and the second communication processor 214 may perform data transmission or reception via the processor 120 (e.g., an application processor) and a HS-UART interface or a PCIe interface, but the type of interface is not limited. For example, the first communication processor 212 and the second communication processor 214 may exchange control information and packet data information using the processor 120 (e.g., an application processor) and a shared memory. According to an embodiment, the first communication processor 212 and the second communication processor 214 may be implemented in a single chip or a single package. According to various embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in the range of approximately 700 MHz to 3 GHz, which is used in the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the baseband signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) in an Sub6 band (e.g., approximately 6 GHz or less) used in the second network 294 (e.g., a 5G network). In the case of reception, a 5G Sub6 RF signal may be obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used in the second network 294 (e.g., a 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal into a baseband signal so that the signal is processed by the second communication processor 214. According to an embodiment, the third RFFE 236 may be implemented as a part of the third RFIC 226.

According to an embodiment, the electronic device 101 may include the fourth RFIC 228, separately from or, as a part of, the third RFIC 226. In this instance, the fourth RFIC 228 may convert a baseband signal produced by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second network 294 (e.g., a 5G network) via an antenna (e.g., the antenna 248), and may be converted into an IF signal by the third RFIC 226. The fourth RFIC 228 may convert the IF signal into a baseband signal so that the second communication processor 214 is capable of processing the baseband signal.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or single package. According to an embodiment, at least one of the first antenna module 242 or the second antenna module 244 may be omitted or may be combined with another antenna module, so as to process RF signals of a plurality of corresponding bands.

According to an embodiment, the third RFIC 226 and the antenna 248 may be disposed in the same substrate, and may form a third antenna module 246. For example, the wireless communication module 192 or the processor 120 may be disposed in a first substrate (e.g., a main PCB). In this instance, the third RFIC 226 is disposed in a part (e.g., a lower part) of a second substrate (e.g., a sub PCB) different from the first substrate, and the antenna 248 is disposed in another part (e.g., an upper part), so that the third antenna module 246 may be formed. By disposing the third RFIC 226 and the antenna 248 in the same substrate, the length of a transmission line therebetween may be reduced. For example, this may reduce a loss (e.g., a diminution) of a high-frequency band signal (e.g., approximately 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be implemented as an antenna array including a plurality of antenna elements which may be used for beamforming. In this instance, the third RFIC 226, for example, may include a plurality of phase shifters 238 corresponding to a plurality of antenna elements, as a part of the third RFFE 236. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second network 294 (e.g., a 5G network) may operate independently (e.g., Standalone (SA)) from the first network 292 (e.g., a legacy network), or may operate by being connected thereto (e.g., Non-Standalone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access the access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

Figure 3:
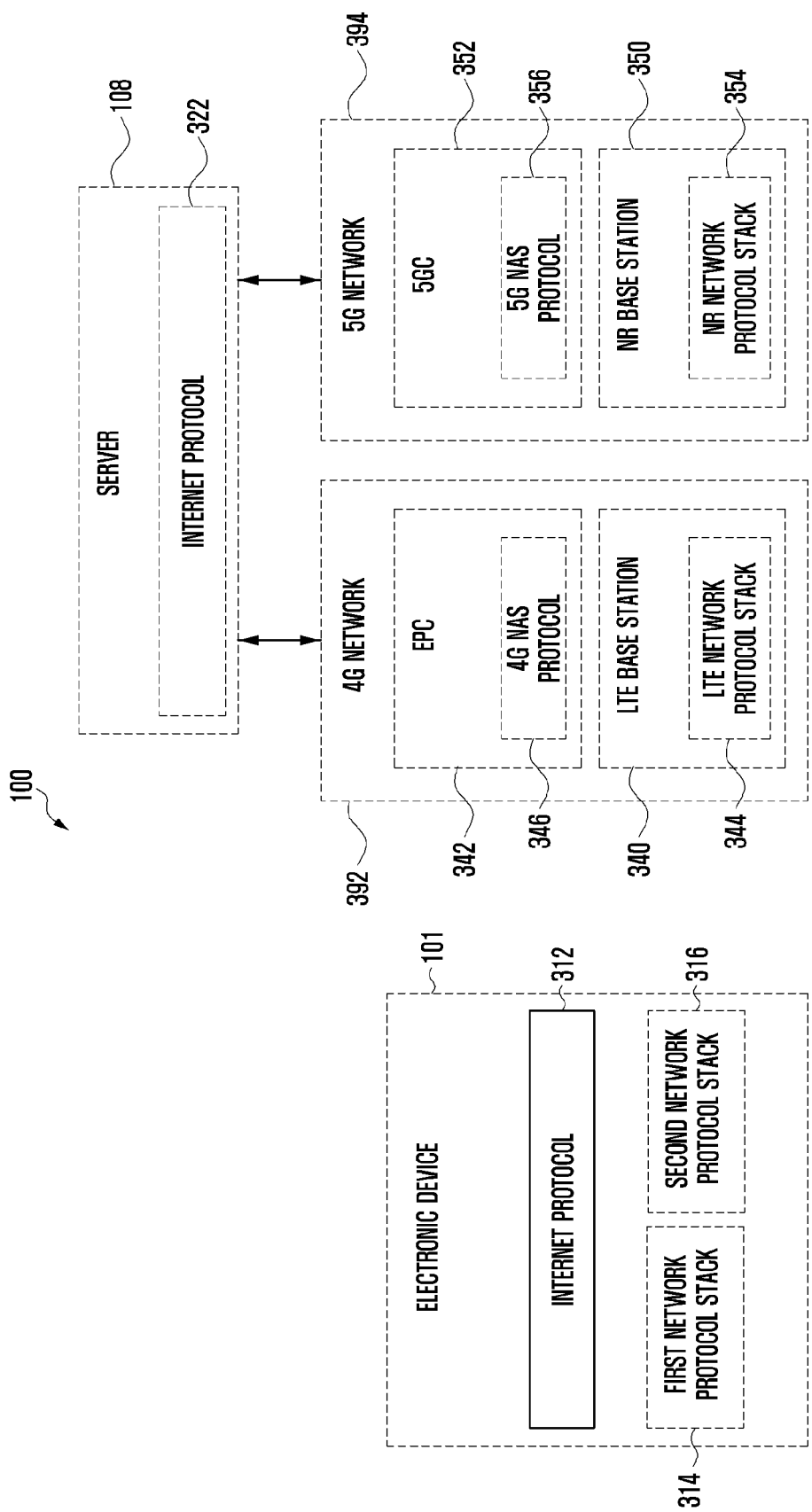
FIG. 3 is a diagram illustrating a protocol stack structure of a network 100 using 4G communication and/or 5G communication according to various embodiments.

FIG. 3 is a diagram illustrating the protocol stack structure of a network 100 of 4G communication and/or 5G communication according to various embodiments.

Referring to FIG. 3, the network 100 according to various embodiments may include the electronic device 101, a 4G network 392, a 5G network 394, and the server 108.

According to various embodiments, the electronic device 101 may include an Internet protocol 312, a first communication protocol stack 314, and a second communication protocol stack 316. For example, the electronic device 101 may communicate with the server 108 via the 4G network 392 and/or 5G network 394.

According to an embodiment, the electronic device 101 may perform Internet communication associated with the server 108 using the Internet protocol 312 (e.g., a transmission control protocol (TCP), a user datagram protocol (UDP), or an internet protocol (IP)). For example, the Internet protocol 312 may be performed in a main processor (e.g., the main processor 121 of FIG. 1) included in the electronic device 101.

According to another embodiment, the electronic device 101 may perform wireless communication with the 4G network 392 using the first communication protocol stack 314. According to another embodiment, the electronic device 101 may perform wireless communication with the 5G network 394 using the second communication protocol stack 316. For example, the first communication protocol stack 314 and the second communication protocol stack 316 may be performed by one or more communication processors (e.g., the wireless communication module 192 of FIG. 1) included in the electronic device 101.

According to various embodiments, the server 108 may include the Internet protocol 322. The server 108 may perform transmission or reception of data related to the Internet protocol 322 with the electronic device 101 via the 4G network 392 and/or 5G network 394. According to an embodiment, the server 108 may include a cloud computing server existing outside the 4G network 392 or the 5G network 394. According to another embodiment, the server 108 may include an edge computing server (or a mobile edge computing (MEC) server) located inside at least one of the 4G network 392 or the 5G network 394.

According to various embodiments, the 4G network 392 may include a long-term evolution (LTE) base station 340 and an evolved packet core (EPC) 342. The LTE base station 340 may include an LTE communication protocol stack 344. The EPC 342 may include a 4G non-access stratum (NAS) protocol 346. The 4G network 392 may perform LTE wireless communication with the electronic device 101 using the LTE communication protocol stack 344 and the 4G NAS protocol 346.

According to various embodiment, the 5G network 394 may include a new radio (NR) base station 350 and a 5th generation core (5GC) 352. The NR base station 350 may include an NR communication protocol stack 354. The 5GC 352 may include a 5G NAS protocol 356. The 5G network 394 may perform NR wireless communication with the electronic device 101 using the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting or receiving a control message and a user plane protocol for transmitting or receiving user data. For example, the control message may include a message related to at least one of security control, bearer setup, authentication, registration, or mobility management. For example, the user data may include, for example, the remaining data, excluding the control message.

According to an embodiment, the control plane protocol and the user plane protocol may include a physical (PHY) layer, a medium access control (MAC) layer, a radio link control (RLC) layer, or a packet data convergence protocol (PDCP) layer. For example, the PHY layer may perform channel coding and modulation of data received from a higher layer (e.g., the MAC layer), and transmit the same to a wireless channel, and may perform demodulation and decoding of data received via a wireless channel and transmit the same to a higher layer. The PHY layer included in the second communication protocol stack 316 and the NR communication protocol stack 354 may further perform an operation related to beamforming. For example, the MAC layer may logically/physically map data to a wireless channel to be transmitted or received, and may perform hybrid automatic repeat request (HARQ) for error correction. For example, the RLC layer may perform concatenation, segmentation, or reassembly of data, may identify the order of data, may perform reordering, and may perform redundancy check. For example, the PDCP layer may perform an operation of ciphering control data and user data, and an operation related to data integrity. The second communication protocol stack 316 and the NR communication protocol stack 354 may further include a service data adaptation protocol (SDAP). For example, the SDAP may manage wireless bearer allocation based on the quality of service (QoS) of user data.

According to various embodiments, the control plane protocol may include a radio resource control (RRC) layer and a non-access stratum (NAS) layer. For example, the RRC layer may process control data related to radio bearer setup, paging, or mobility management. For example, the NAS may process a control message related to authentication, registration, and mobility management.

Figure 4A:
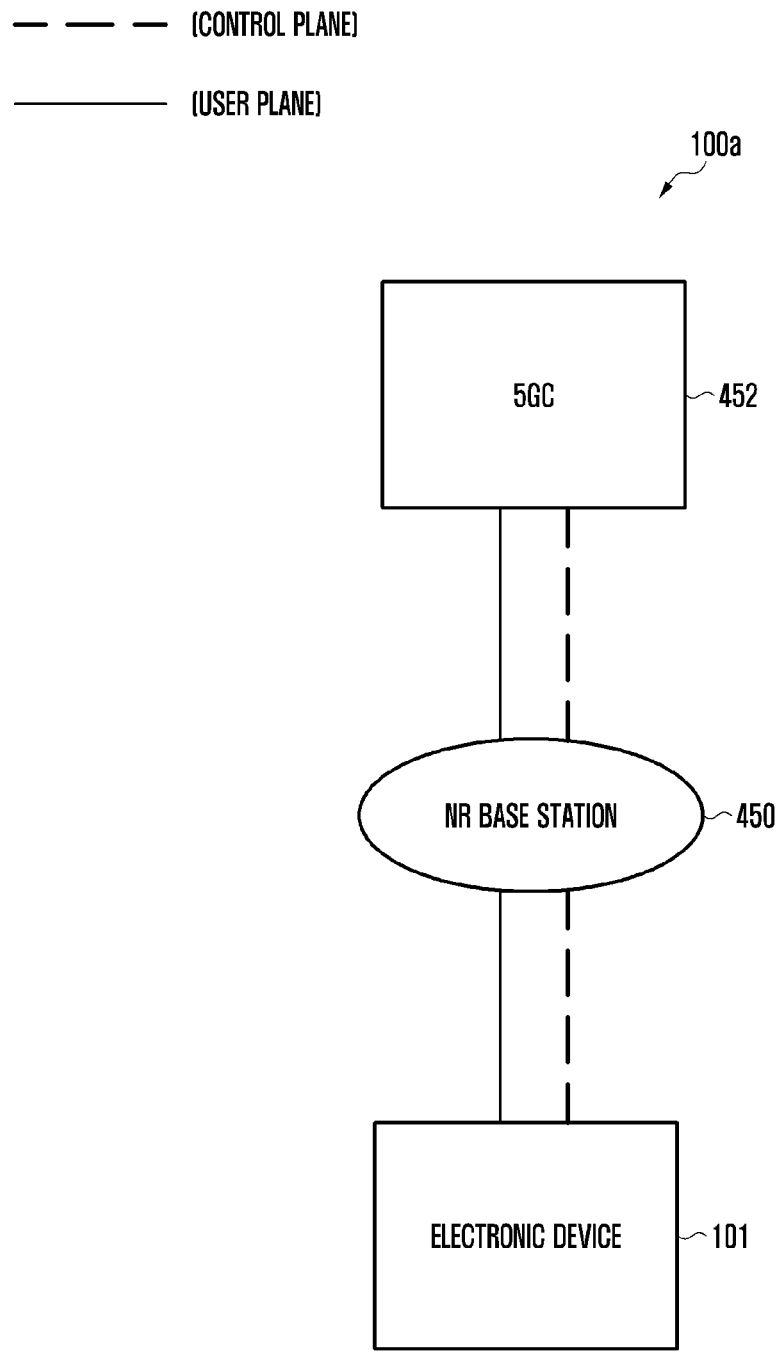
FIG. 4A is an example of a wireless communication system providing the network using the 4G communication and/or the 5G communication according to various embodiments.
Figure 4B:
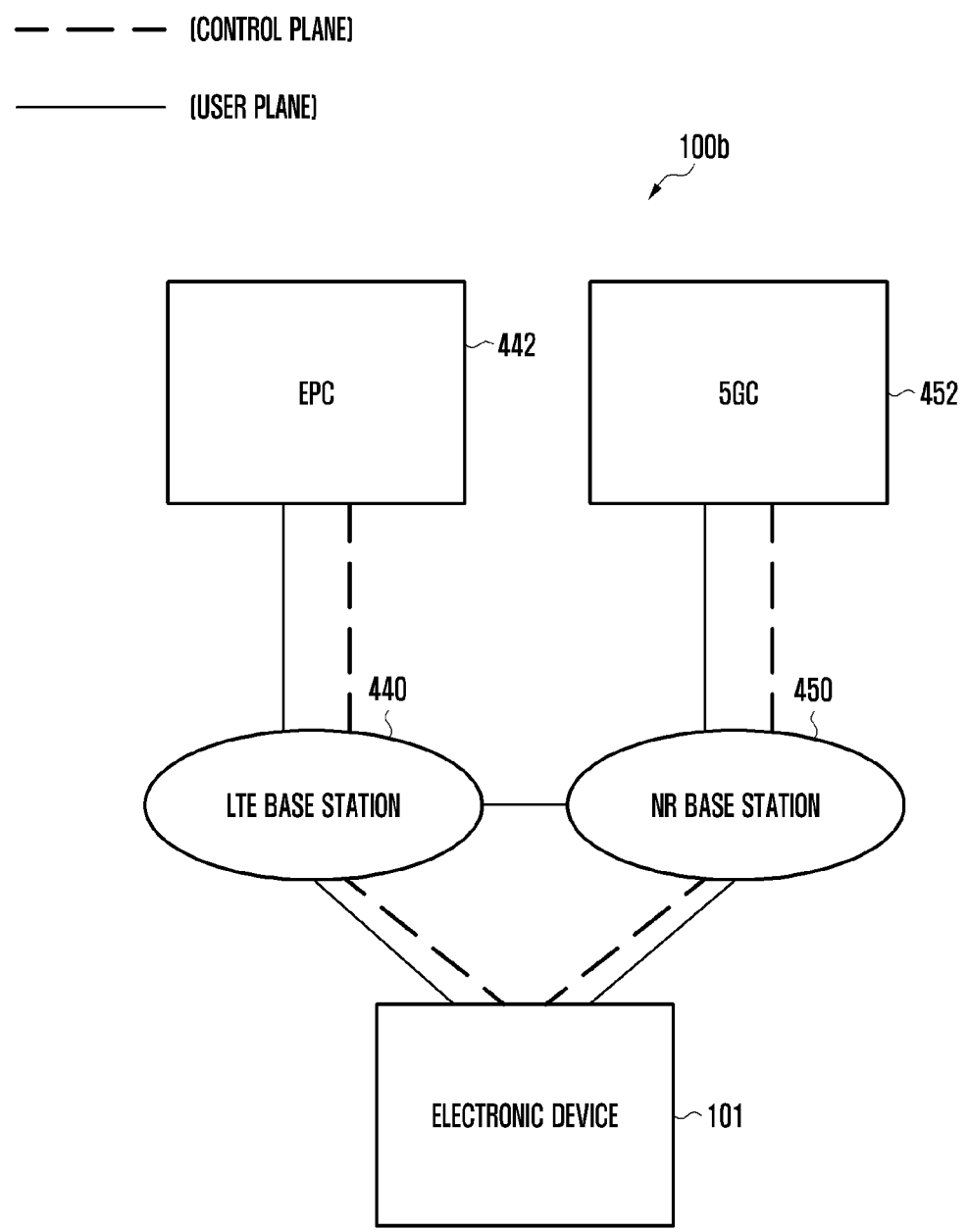
FIG. 4B is an example of a wireless communication system providing the network using the 4G communication and/or the 5G communication according to various embodiments.

FIGS. 4A and 4B are examples of a wireless communication system providing a network using 4G communication and/or 5G communication according to various embodiments.

According to various embodiments referring to FIGS. 4A and 4B, a network environment 100a and/or 100b may include at least one of a 4G network or a 5G network. For example, the 4G network may include an LTE base station 440 (e.g., an eNodeB (E-UTRAN Node B, eNB)) based on the 3GPP standard supporting wireless access to the electronic device 101 and an evolved packet core (EPC) 442 managing 4G communication. For example, the 5G network may include a new radio (NR) base station 450 (e.g., a gNodeB (gNB)) supporting wireless access to the electronic device 101 and a $5^{th}$ generation core (5GC) 452 managing 5G communication of the electronic device 101.

According to various embodiments, the electronic device 101 may transmit and/or receive control messages and user data through 4G communication and/or 5G communication. For example, the control message may include a message related to at least one of security control, bearer setup, authentication, registration, or mobility management of the electronic device 101. For example, the user data may mean user data other than control messages transmitted and/or received between the electronic device 101 and a core network (e.g., the EPC 442 and/or the 5GC 452).

According to various embodiments referring to FIG. 4A, the 5G network 100a may independently transmit and/or receive control messages and/or user data to and/or the electronic device 101.

According to various embodiments referring to FIG. 4B, the 4G network and the 5G network 100b may independently provide the transmission and/or reception of data. For example, the electronic device 101 and the EPC 442 may transmit and/or receive control messages and/or user data through the LTE base station 440. For example, the electronic device 101 and the 5GC 452 may transmit and/or receive control messages and/or user data through the NR base station 450.

According to various embodiments, the electronic device 101 may be registered with at least one of the EPC 442 or the 5GC 452 and transmit and/or receive control messages.

According to various embodiments, the EPC 442 or the 5GC 452 may manage the communication of the electronic device 101 through interworking. For example, movement information of the electronic device 101 may be transmitted and/or received through an interface (e.g., an N26 interface) between the EPC 442 and the 5GC 452.

Figure 5:
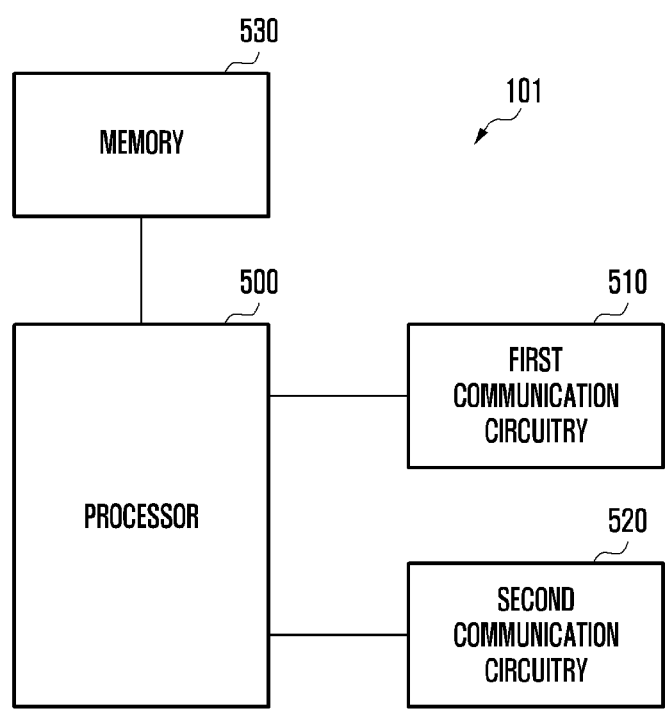
FIG. 5 is a block diagram of an electronic device for providing a call function according to various embodiments.

FIG. 5 is a block diagram of an electronic device for providing a call function according to various embodiments.

According to various embodiments referring to FIG. 5, the electronic device 101 may include a processor (e.g., including processing circuitry) 500, first communication circuitry 510, second communication circuitry 520 and/or a memory 530. According to an embodiment, the processor 500 may be substantially identical with the processor 120 in FIG. 1 or may be included in the processor 120. The first communication circuitry 510 and/or the second communication circuitry 520 may be substantially identical with the wireless communication module 192 in FIG. 1 or may be included in the wireless communication module 192. The memory 530 may be substantially identical with the memory 130 in FIG. 1 or may be included in the memory 130. According to an embodiment, the processor 500, the first communication circuitry 510 and/or the second communication circuitry 520 may be implemented within a single chip or a single package. According to an embodiment, the processor 500, the first communication circuitry 510 and/or the second communication circuitry 520 may be implemented as different chips. According to an embodiment, the processor 500 (e.g., the first communication processor 212 and/or the second communication processor 214 in FIG. 2) may be operatively connected to the first communication circuitry 510 and/or the second communication circuitry 520.

According to various embodiments, the first communication circuitry 510 may transmit and/or receive control messages and/or data to and/or from a first node (e.g., the NR base station 450 in FIG. 4B) and/or a second node (e.g., the LTE base station 440) through cellular communication. According to an embodiment, the first communication circuitry 510 may include a first processing part and a second processing part. For example, the first processing part may transmit and/or receive control messages and/or data to and/or from a first node (e.g., the NR base station 450 in FIG. 4B) through first wireless communication. For example, the first wireless communication may include a 5G communication method (e.g., new radio (NR)) using a stand-along (SA) method. For example, the second processing part may transmit and/or receive control messages and/or data to and/or a second node (e.g., the LTE base station 440 in FIG. 4B) through second wireless communication. For example, the second wireless communication may include at least one of long-term evolution (LTE), LTE-advanced (LTE-A) or LTE advanced pro (LTE-A pro)) as a 4G communication method. For example, the first processing part and the second processing part may be composed of software which processes signals having different frequency bands and protocols. For example, the first processing part and the second processing part may be logically (e.g., software) divided. For example, the first processing part and the second processing part may be composed of different circuits or different hardware.

According to an embodiment, the first communication circuitry 510 may include an RFIC (e.g., the second RFIC 224 in FIG. 2 and/or the third RFIC 226 in FIG. 2) and an RFFE (e.g., the second RFFE 234 in FIG. 2 and/or the third RFFE 236 in FIG. 2) related to first wireless communication and and/or an RFIC (e.g., the first RFIC 222 in FIG. 2) and/or an RFFE (e.g., the first RFFE 232 in FIG. 2) related to second wireless communication.

According to various embodiments, the second communication circuitry 520 may transmit and/or receive control messages and/or data to and/or from a third node (e.g., an access point (AP)) through third wireless communication. For example, the third wireless communication may include a wireless LAN communication method (e.g., Wi-Fi) as a communication method using an unlicensed spectrum.

According to various embodiments, the processor 500 (e.g., the first communication processor 212 and/or the second communication processor 214 in FIG. 2) may control the first communication circuitry 510 to connect (or establish) a protocol data unit (PDU) session for a call connection with an external electronic device. According to an embodiment, the processor 500 may control the first communication circuitry 510 and/or the second communication circuitry 520 to connect a PDU session for the reception of a call transmitted by an external electronic device and/or for the transmission of a call by the electronic device 101. For example, the PDU session may include an Internet protocol multimedia subsystem (IMS) PDU session.

According to an embodiment, when a call connection mode of the electronic device 101 is configured as a first call connection mode (e.g., a cellular preferred mode), the processor 500 may check signal quality of a first network using first wireless communication (or a second network using second wireless communication). When the signal quality of the first network satisfies designated first quality, the processor 500 may control the first communication circuitry 510 to register the electronic device 101 with the first network using first wireless communication. For example, the state in which the designated first quality is satisfied may include a state in which the signal quality of the first network using first wireless communication is equal to or higher than first reference intensity (e.g., about −110 decibel milliwatts (dBm)). For example, signal quality of a network may include at least one of reference signal received power (RSRP), reference signal received quality (RSRQ), a received strength indicator (RSSI), a signal to interference plus noise ratio (SINR), a transmission and reception error rate, packet transmission and reception delay, or quality of service (QoS). For example, the call connection mode may be configured based on a call policy of the electronic device 101 and/or a user input.

According to an embodiment, the processor 500 may control the first communication circuitry 510 to register the electronic device 101 with an IMS server (e.g., the server 580 in FIG. 5) over the first network using first wireless communication with which the electronic device 101 is registered. When the electronic device 101 is registered with the IMS server over the first network, the processor 500 may determine that a PDU session is connected over the first network.

According to various embodiments, the processor 500 (e.g., the first communication processor 212 and/or the second communication processor 214 in FIG. 2) may control the first communication circuitry 510 to establish a communication link for a call connection with an external electronic device. According to an embodiment, the processor 500 may control the first communication circuitry 510 to transmit a request signal (e.g., SIP INVITE (MO call)) related to the call connection through the PDU session connected over the first network, based on the occurrence of an event related to the request for the call connection with the external electronic device. According to an embodiment, when receiving a request signal (e.g., SIP INVITE (MT call)) related to the call connection through the PDU session connected over the first network, the processor 500 may control the first communication circuitry 510 to transmit a response signal (e.g., 100 trying) for the request signal to the IMS server. According to an embodiment, when the first network using first wireless communication does not support a call function (e.g., VoNR), the processor 500 may receive, from the first network, information related to a redirection (or inter radio access technology (IRAT) handover) through the first communication circuitry 510. For example, the information related to the redirection (or IRAT handover) may be included in an RRC message (e.g., RRC release) received from the first network. For example, the information related to the redirection may include frequency information related to the second wireless communication. For example, the event related to the request for the call connection with the external electronic device may be generated based on the execution of a call application and/or the input of a call button.

According to an embodiment, the processor 500 may control the first communication circuitry 510 to register the electronic device 101 with the second network using second wireless communication based on information related to a redirection (or IRAT handover) received from the first network. For example, the processor 500 may control the first communication circuitry 510 to perform search (or a scan) related to the second wireless communication based on frequency information related to the second wireless communication, which is included in the information related to the redirection (or IRAT handover) received from the first network. The processor 500 may control the first communication circuitry 510 to register the electronic device 101 with the second network discovered through the search related to the second wireless communication.

According to an embodiment, the processor 500 may control the first communication circuitry 510 to re-register the electronic device 101 with an IMS server (e.g., the server 580 in FIG. 5) based on the registration with the second network using second wireless communication. For example, when the electronic device 101 is registered with the IMS server over the second network, the processor 500 may determine that the connection of a PDU session to the second network has changed (or hand overed).

According to an embodiment, when the connection of a PDU session to the second network is changed, the processor 500 may control the first communication circuitry 510 to connect a call with an external electronic device over the second network.

According to various embodiments, when the establishment of a communication link for a call connection with an external electronic device over a cellular network (e.g., the first network and the second network) fails, the processor 500 (e.g., a communication processor) may identify whether a call connection using a third network using third wireless communication is possible.

According to an embodiment, when not receiving information related to a redirection (or IRAT handover) from the first network for designated first time, the processor 500 may determine that the establishment of a communication link for a call connection with an external electronic device over a cellular network fails. For example, the designated first time may include a time interval predefined to determine a reception failure of information related to a redirection (or IRAT handover). For example, the designated first time may include timing at which a request signal (e.g., SIP INVITE (MO call)) related to a call connection is transmitted, timing at which a response signal (e.g., a 100 trying or 183 session progress) corresponding to a request signal is received, timing at which a request signal (e.g., SIP INVITE (MT call)) related to a call connection is received and/or an elapse time from timing at which a response signal (e.g., 100 trying) corresponding to a request signal is transmitted.

According to an embodiment, when determining that IRAT handover to the second network using second wireless communication fails, the processor 500 may determine that the establishment of a communication link for a call connection with an external electronic device over a cellular network fails. For example, if a QoS flow or a dedicated bearer has not been configured for a designated second time, the processor 500 may determine that the IRAT handover to the second network fails. For example, the designated second time may include a time interval predefined to determine whether the IRAT handover fails.

According to an embodiment, if the second network is not discovered through search related to second wireless communication based on information related to a redirection (or IRAT handover), the processor 500 may determine that the establishment of a communication link for a call connection with an external electronic device over a cellular network fails.

According to an embodiment, if the second network discovered through search related to second wireless communication based on information related to a redirection (or IRAT handover) does not support a call function, the processor 500 may determine that the establishment of a communication link for a call connection with an external electronic device over a cellular network fails. For example, the processor 500 may identify whether a call function (e.g., a multimedia telephony service (MMTEL)) is supported in access barring (ACB) of a system information block (e.g., a system information block (SIB) 1) received from the second network through the first communication circuitry 510. For example, when the electronic device 101 registers with the second network, the processor 500 may obtain information related to a call function (e.g., VoLTE) of the second network from the second network. The processor 500 may identify whether the second network support the call function in the information related to the call function and obtained from the second network. For example, the information related to the call function and obtained from the second network may be obtained through a capability negotiation with the second network.

According to an embodiment, if registration with the second network discovered through search related to second wireless communication based on information related to a redirection (or IRAT handover) fails, the processor 500 may determine that the establishment of a communication link for a call connection with an external electronic device over a cellular network fails. For example, if a random-access channel (RACH) toward the second network using second wireless communication discovered through search related to the second wireless communication fails, the processor 500 may determine that registration with the second network fails. For example, if a tracking area update (TAU) toward the second network using second wireless communication discovered through search related to the second wireless communication fails, the processor 500 may determine that registration with the second network fails. For example, when receiving an Attach Reject message including information of a network failure (e.g., cause #17) or congestion (e.g., cause #22) from the second network through the first communication circuitry 510, the processor 500 may determine that a TAU toward the second network fails.

According to an embodiment, when transmitting or receiving a request signal (e.g., SIP INVITE (MO call)) related to a call connection through a PDU session connected over the first network, the processor 500 may identify whether the first network accessed by the electronic device 101 supports a call function (e.g., VoNR). For example, the processor 500 may identify whether the first network supports the call function based on a call connection history (or a call success history) of the electronic device 101 using the first network. According to an embodiment, when the first network does not support the call function, the processor 500 may identify whether the electronic device 101 supports the second wireless communication. For example, upon registration with the first network using first wireless communication, the processor 500 may control the first communication circuitry 510 to transmit, to the first network, information (e.g., S1 mode) related to whether second wireless communication is used. If the electronic device 101 is configured not to use second wireless communication (e.g., "S1 mode not requested") upon registration with the first network, the processor 500 may determine that the electronic device 101 does not support the second wireless communication. According to an embodiment, when determining that the first network does not support a call function and the electronic device 101 does not support second wireless communication, the processor 500 may determine that the establishment of a communication link for a call connection with an external electronic device over a cellular network fails.

According to an embodiment, the processor 500 may control the first communication circuitry 510 to register the electronic device 101 with the second network discovered through search related to second wireless communication based on information related to a redirection (or IRAT handover). When failing in a change (or handover) of a PDU session to the second network, the processor 500 may determine that the establishment of a communication link for a call connection with an external electronic device over a cellular network fails.

According to an embodiment, when determining that the establishment of a communication link for a call connection with an external electronic device over a cellular network fails, the processor 500 may determine that the call connection with the external electronic device is possible over the third network using third wireless communication. For example, the processor 500 may determine that the call connection with the external electronic device is possible over the third network based on at least one of whether the address of an enhance packet data gateway (ePDG) is obtained, the validity of call context or signal quality of the third network. For example, the address of the ePDG may be obtained based on a fully qualified domain name (FQDN) procedure. For example, the validity of the call context may be identified based on whether a timer related to the call context becomes extinct. For example, the call context may include call-related information (e.g., a call state, wireless communication information and/or a telephone number) generated by the IMS server based on a call request from an electronic device (or an external electronic device). For example, the signal quality of the third network may include at least one of RSRP, RSRQ, an RSSI, an SINR, a transmission and reception error rate, packet transmission and reception delay or QoS of the third network, which are checked through the second communication circuitry 520. For example, if the address of the ePDG is obtained, it is determined that the call context is valid, and the signal quality of the third network satisfies designated quality, the processor 500 may determine that a call connection with an external electronic device is possible over the third network. For example, if the address of the ePDG has not been obtained or it is determined that the call context is not valid or it is determined that the signal quality of the third network does not satisfy the designated quality, the processor 500 may determine that the call connection with the external electronic device is impossible over the third network. For example, the state in which the signal quality of the third network does not satisfy the designated quality may include a state in which the third network accessed by the electronic device 101 is not present.

According to various embodiments, when determining that a call connection with an external electronic device is possible over the third network using third wireless communication, the processor 500 (e.g., a communication processor) may control the second communication circuitry 520 to connect a call with the external electronic device over the third network using third wireless communication. According to an embodiment, when determining that the call connection with the external electronic device is possible over the third network using third wireless communication, the processor 500 may control the second communication circuitry 520 to connect (e.g., form an ePDG tunnel) communication with the ePDG over the third network using third wireless communication. The processor 500 may control the second communication circuitry 520 to register (or re-register) the electronic device 101 with the IMS server through the ePDG based on the communication connection with the ePDG. When the electronic device 101 is registered with the IMS server through the ePDG, the processor 500 may control the second communication circuitry 520 to connect a call with the external electronic device over the third network. For example, when the electronic device 101 is registered with the IMS server through the ePDG, the processor 500 may control the first communication circuitry 510 to release a connection of a PDU session (e.g., an IMS PDU session) using the first network.

According to various embodiments, when determining that a call connection with an external electronic device is impossible over the third network using third wireless communication, the processor 500 (e.g., a communication processor) may control the first communication circuitry 510 and/or the second communication circuitry 520 to search for a network for the call connection with the external electronic device. According to an embodiment, when determining that the call connection with the external electronic device is impossible over the third network in the state in which a request signal for the call connection is transmitted to the external electronic device, the processor 500 may control the first communication circuitry 510 to perform search for second wireless communication or search for the legacy network. For example, the search for the second wireless communication may include a series of operations of searching for whether a network using second wireless communication for a call connection with an external electronic device is present. For example, the search (e.g., a hedge scan) for the legacy network may include a series of operations of searching for whether a circuit switching (CS) network for a call connection with an external electronic device is present. For example, when discovering a network using second wireless communication for a call connection with an external electronic device through search for second wireless communication, the processor 500 may perform the call connection with the external electronic device over the network using second wireless communication. For example, when discovering a CS network for a call connection with an external electronic device through search for a legacy network, the processor 500 may perform the call connection with the external electronic device over the CS network.

According to various embodiments, when determining that a call connection with an external electronic device is impossible over the third network using third wireless communication, the processor 500 (e.g., a communication processor) may determine that the call connection with the external electronic device fails. According to an embodiment, when determining that a call connection with an external electronic device is impossible over the third network in the state in which a request signal for the call connection is received from the external electronic device, the processor 500 may determine that the call connection with the external electronic device fails.

According to various embodiments, the memory 530 may store various data used by at least one constituent element (e.g., the processor 500, the first communication circuitry 510 and/or the second communication circuitry 520) of the electronic device 101. According to an embodiment, the memory 530 may store various instructions executable through the processor 500.

According to various embodiments, an electronic device (e.g., the electronic device 101 in FIG. 1, 2, 3, 4A, 4B, or 5) may include first communication circuitry (e.g., the wireless communication module 192 in FIG. 1 or the first communication circuitry 510 in FIG. 5), which supports new radio (NR) communication and/or long term evolution (LTE) communication; second communication circuitry (e.g., the wireless communication module 192 in FIG. 1 or the second communication circuitry 520 in FIG. 5), which supports wireless LAN communication; and at least one processor (e.g., the processor 120 in FIG. 1, the first communication processor 212 or the second communication processor 214 in FIG. 2 or the processor 500 in FIG. 5) operatively connected to the first communication circuitry and the second communication circuitry. The processor may register with a network using the NR communication through the first communication circuitry, may identify whether a call connection using a network using the wireless LAN communication is possible when determining that the establishment of a communication link related to a call connection with an external electronic device using the network using the NR communication and/or a network using the LTE communication fails, and may connect a call with the external electronic device over the network using the wireless LAN communication when determining that the call connection using the network using the wireless LAN communication is possible.

According to various embodiments, the processor may register with the network using the NR communication based on a control message received over the network using the NR communication, and may register with an Internet protocol multimedia subsystem (IMS) server over the network using the NR communication.

According to various embodiments, the processor may transmit, to the network using the NR communication, a request signal related to a call connection with the external electronic device. When not receiving information related to handover of a protocol data unit (PDU) session and/or information related to a redirection from the network using the NR communication for a designated time, the processor may determine that the establishment of a communication link related to the call connection with the external electronic device using the network using the NR communication and/or the network using the LTE communication fails.

According to various embodiments, the processor may transmit, to the network using the NR communication, a request signal related to the call connection with the external electronic device, may perform a registration procedure with the network using the LTE communication, based on information related to handover of a protocol data unit (PDU) session and/or information related to a redirection received from the network using the NR communication, and may determine that the establishment of the communication link related to the call connection with the external electronic device using the network using the NR communication and/or the network using the LTE communication has fails when the registration with the network using the LTE communication fails.

According to various embodiments, the processor may transmit, to the network using the NR communication, a request signal related to the call connection with the external electronic device, may perform search for the network using the LTE communication based on information related to handover of a protocol data unit (PDU) session and/or information related to a redirection, which is received from the network using the NR communication, and may determine that the establishment of the communication link related to the call connection with the external electronic device using the network using the NR communication and/or the network using the LTE communication fails when the search for the network using the LTE communication fails.

According to various embodiments, the processor may transmit, to the network using the NR communication, a request signal related to the call connection with the external electronic device, may search for the network using the LTE communication based on information related to handover of a protocol data unit (PDU) session and/or information related to a redirection, which is received from the network using the NR communication, and may determine that the establishment of the communication link related to the call connection with the external electronic device using the network using the NR communication and/or the network using the LTE communication fails if the network using the LTE communication does not support a call function.

According to various embodiments, the processor may transmit, to the network using the NR communication, a request signal related to the call connection with the external electronic device, may register with the network using the LTE communication based on information related to handover of a protocol data unit (PDU) session and/or information related to a redirection received from the network using the NR communication, and may determine that the establishment of the communication link related to the call connection with the external electronic device using the network using the NR communication and/or the network using the LTE communication fails when handover of a protocol data unit (PDU) session to the network using the LTE communication fails.

According to various embodiments, the processor may identify whether the call connection with the external electronic device using the network using the wireless LAN communication is possible, based on at least one of whether an address of an evolved packet data gateway (ePDG) is obtained, whether call context information related to an IMS server is valid, or signal quality of the network using the wireless LAN communication.

According to various embodiments, the processor may determine that the call connection with the external electronic device using the network using the wireless LAN communication is possible, if the address of the ePDG is obtained, the call context information related to the IMS server is valid, and the signal quality of the network using the wireless LAN communication satisfies a designated condition.

According to various embodiments, the processor may perform handover of a protocol data unit (PDU) session to the network using the wireless LAN through an ePDG when determining that the call connection using the network using the wireless LAN communication is possible, may re-register with an IMS server over the network using the wireless LAN, and may perform the call connection with the external electronic device over the network using the wireless LAN.

Figure 6:
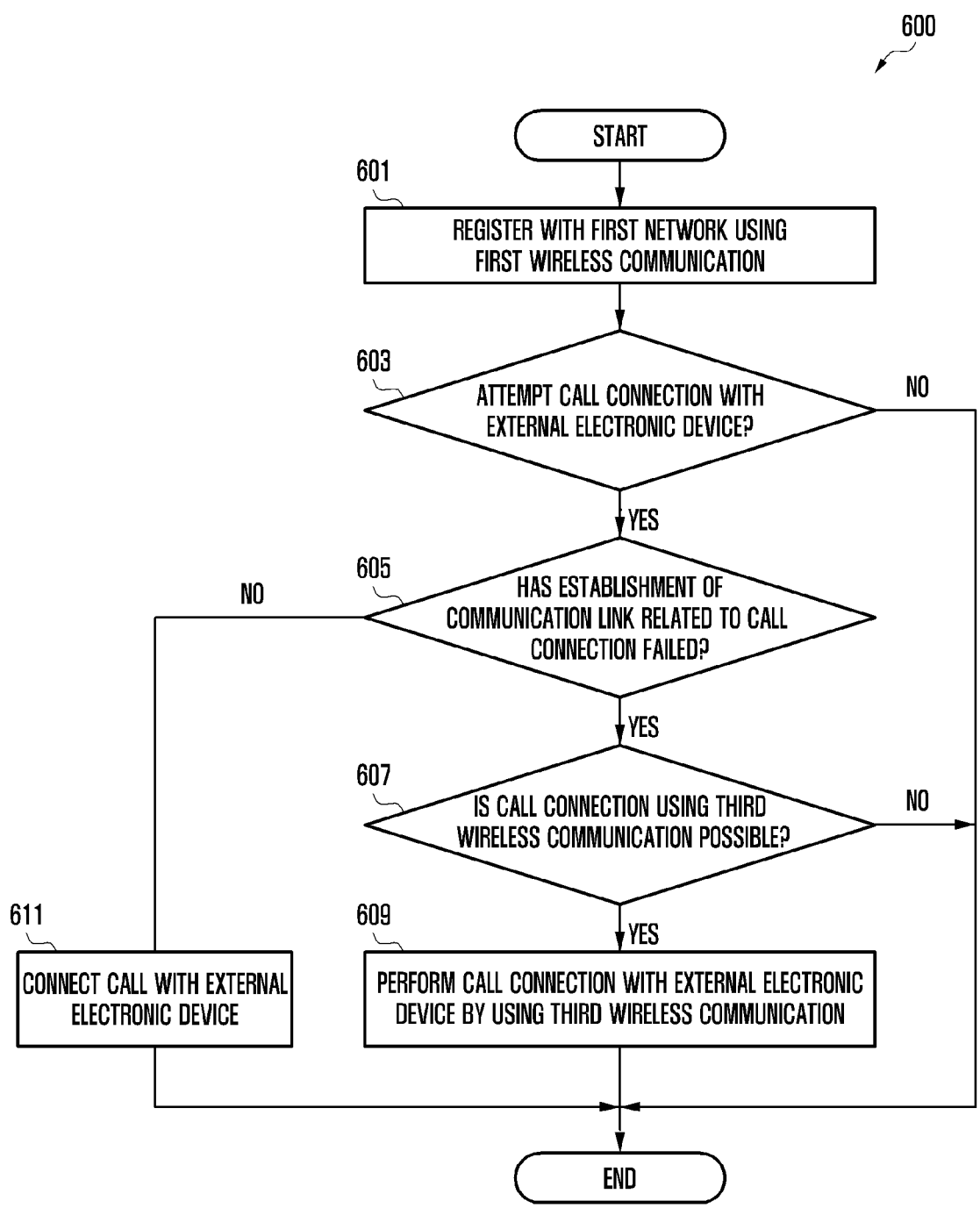
FIG. 6 is a flowchart for connecting a call with an external electronic device in the electronic device according to various embodiments.

FIG. 6 is a flowchart 600 for connecting a call with an external electronic device in the electronic device according to various embodiments. In the following embodiment, operations may be sequentially performed, but are not essentially sequentially performed. For example, the sequence of the operations may be changed, and at least two operations may be performed in parallel. For example, the electronic device may be the electronic device 101 in FIG. 1, 2, 3, 4A, 4B, or 5.

According to various embodiments referring to FIG. 6, in operation 601, an electronic device (e.g., the wireless communication module 192 in FIG. 1, the processor 120 in FIG. 1, the first communication circuitry 510 in FIG. 5 or the processor 500 in FIG. 5) may be registered with the first network using first wireless communication. According to an embodiment, when a call connection mode of the electronic device 101 is configured as a first call connection mode (e.g., a cellular preferred mode), the processor 500 (e.g., a communication processor) may identify whether a cellular network (e.g., the first network using first wireless communication or the second network using second wireless communication) accessible to the electronic device 101 is present through the first communication circuitry 510. When signal quality of the first network satisfies designated first quality, the processor 500 may control the first communication circuitry 510 (e.g., the first processing part) to register with the first network using first wireless communication (e.g., NR communication). For example, if the first network using first wireless communication is operated independently of the second network using second wireless communication (e.g., stand-alone (SA)), the processor 500 may control the first communication circuitry 510 to preferentially register with the first network using first wireless communication.

According to an embodiment, the processor 500 may control the first communication circuitry 510 (e.g., the first processing part) to connect a PDU session over the first network with which the electronic device 101 is registered. For example, the PDU session may include an Internet protocol multimedia subsystem (IMS) PDU session.

According to various embodiments, in operation 603, an electronic device (e.g., the processor 120 or 500) may determine whether to perform a call connection with an external electronic device. According to an embodiment, the processor 500 may determine to perform the call connection with the external electronic device, based on the occurrence of an event related to the request for the call connection with the external electronic device. For example, the event related to the request for the call connection with the external electronic device may be generated based on the execution of a call application and/or the input of a call button. According to an embodiment, when receiving a request signal (e.g., SIP INVITE (MT call)) related to the call connection through a PDU session connected over the first network, the processor 500 may determine to perform the call connection with the external electronic device.

According to various embodiments, when determining to not perform the call connection with the external electronic device (e.g., "No" in operation 603), an electronic device (e.g., the processor 120 or 500) may terminate an embodiment for the call connection with the external electronic device.

According to various embodiments, when determining to perform the call connection with the external electronic device (e.g., "Yes" in operation 603), in operation 605, an electronic device (e.g., the processor 120 or 500) may identify a failure of the establishment of a communication link for the call connection with the external electronic device over the cellular network. According to an embodiment, when not receiving information related to a redirection (or IRAT handover) from the first network for designated first time, the processor 500 may determine that the establishment of the communication link for the call connection with the external electronic device over the cellular network fails.

According to an embodiment, when determining that IRAT handover to the second network using second wireless communication fails, the processor 500 may determine that the establishment of a communication link for a call connection with an external electronic device over a cellular network fails.

According to an embodiment, when not discovering the second network through search related to second wireless communication based on information related to a redirection (or IRAT handover), the processor 500 may determine that the establishment of a communication link for a call connection with an external electronic device over a cellular network fails.

According to an embodiment, if the second network discovered through search related to second wireless communication based on information related to a redirection (or IRAT handover) does not support a call function, the processor 500 may determine that the establishment of a communication link for a call connection with an external electronic device over a cellular network fails.

According to an embodiment, if registration with the second network discovered through search related to second wireless communication based on information related to a redirection (or IRAT handover) fails, the processor 500 may determine that the establishment of a communication link for a call connection with an external electronic device over a cellular network fails.

According to an embodiment, if the electronic device 101 is configured to not use second wireless communication (e.g., "S1 mode not requested") upon registration the first network, the processor 500 may determine that the establishment of a communication link for a call connection with an external electronic device over a cellular network fails.

According to an embodiment, when failing in a change (or handover) of a PDU session to the second network using second wireless communication, the processor 500 may determine that the establishment of a communication link for a call connection with an external electronic device over a cellular network fails.

According to various embodiments, when determining that the establishment of the communication link for the call connection with the external electronic device over the cellular network fails (e.g., in operation 605 "Yes"), in operation 607, an electronic device (e.g., the processor 120 or 500) may identify whether the call connection with the external electronic device is possible over the third network using third wireless communication. According to an embodiment, the processor 500 may determine that the call connection with the external electronic device is possible over the third network based on at least one of whether the address of an enhance packet data gateway (ePDG) is obtained, the validity of call context, or signal quality of the third network. For example, the address of the ePDG may be obtained based on an FQDN procedure. For example, whether the address of the ePDG is obtained may indicate whether communication with the ePDG is connected over the third network using third wireless communication. For example, the validity of the call context may be identified based on whether a timer related to the call context becomes extinct. For example, a driving time of the timer related to context may be configured as a driving time of an Invite transaction limit time timer (e.g., a timer B) if a dedicated bearer (DBR) timer is not present in the electronic device 101. For example, the driving time of the timer related to context may be configured as a relatively short driving time among an Invite transaction limit time timer (e.g., the timer B) and the dedicated bearer (DBR) timer upon first driving in a situation in which the DBR timer is present in the electronic device 101. For example, the driving time of the timer related to context may be configured as a driving time of an Invite transaction limit time timer (e.g., timer B) when the timer related to context is not first driven in a situation in which the DBR timer is present in the electronic device 101. For example, the timer related to context may be driven at timing at which a request signal (e.g., SIP INVITE (MO call)) related to a call connection is transmitted and/or at timing at which a request signal (e.g., SIP INVITE (MT call)) related to a call connection is received. For example, the driving of the timer related to context may be terminated when a response signal (e.g., 200 OK) corresponding to a request signal (e.g., SIP INVITE (MO call)) related to a call connection is received or a response signal (e.g., 200 OK) corresponding to a request signal (e.g., SIP INVITE (MT call)) related to a call connection is transmitted. For example, the signal quality of the third network may include at least one of RSRP, RSRQ, an RSSI, an SINR, a transmission and reception error rate, packet transmission and reception delay, or QoS of the third network, which is checked through the second communication circuitry 520.

According to various embodiments, when determining that the call connection with the external electronic device using the third network using third wireless communication is impossible (e.g., "No" in operation 607), an electronic device (e.g., the processor 120 or 500) may terminate an embodiment for the call connection with the external electronic device. According to an embodiment, if the address of an ePDG is not obtained, it is determined that call context is not valid, or it is determined that signal quality of the third network does not satisfy designated quality, the processor 500 may determine that the call connection with the external electronic device is impossible over the third network. According to an embodiment, when determining that a call connection with an external electronic device is impossible over the third network in the state in which a request signal for the call connection is received from the external electronic device, the processor 500 may determine that the call connection with the external electronic device fails. According to an embodiment, when determining that a call connection with an external electronic device is impossible over the third network in the state in which a request signal for the call connection is transmitted to the external electronic device, the processor 500 may control the first communication circuitry 510 to perform search for second wireless communication or search for a legacy network.

According to various embodiments, when determining that the call connection with the external electronic device is possible over the third network using third wireless communication (e.g., "Yes" in operation 607), in operation 609, an electronic device (e.g., the processor 120 or 500) may identify whether the call connection with the external electronic device is possible over the third network using third wireless communication. According to an embodiment, if the address of an ePDG is obtained, it is determined that call context is valid, and signal quality of the third network satisfies designated quality, the processor 500 may determine that the call connection with the external electronic device is possible over the third network. According to an embodiment, when determining that the call connection with the external electronic device is possible over the third network using third wireless communication, the processor 500 may control the second communication circuitry 520 to connect communication with an ePDG over the third network using third wireless communication (e.g., form an ePDG tunnel). The processor 500 may control the second communication circuitry 520 to register (or re-register) with an IMS server through the ePDG based on the communication connection with the ePDG. When registering with the IMS server through the ePDG, the processor 500 may control the second communication circuitry 520 to connect a call with the external electronic device through the third network and the ePDG. For example, when the electronic device 101 is registered with the IMS server through the ePDG, the processor 500 may control the first communication circuitry 510 to release a connection of a PDU session (e.g., an IMS PDU session) using the first network.

According to various embodiments, when determining that the establishment of the communication link for the call connection with the external electronic device over the cellular network has succeeded (e.g., "No" in operation 605), in operation 611, an electronic device (e.g., the processor 120 or 500) may connect a call with the external electronic device through the communication link using the cellular network. According to an embodiment, if the first network using first wireless communication does not support a call function, the processor 500 may control the first communication circuitry 510 to change the PDU session to the second network using second wireless communication based on EPS fallback. The processor 500 may control the first communication circuitry 510 to connect a call with the external electronic device through a PDU session established over the second network.

According to various embodiments, when determining that a call connection with an external electronic device is impossible over a cellular network and the third network, the electronic device 101 may control the first communication circuitry 510 and/or the second communication circuitry 520 to search for a network for the call connection with the external electronic device. According to an embodiment, when determining that a call connection with an external electronic device is impossible over a cellular network and the third network in the state in which a request signal for the call connection is transmitted to the external electronic device, the processor 500 may control the first communication circuitry 510 to perform search for second wireless communication. For example, when discovering a network using second wireless communication for a call connection with an external electronic device through search for second wireless communication, the processor 500 may perform the call connection with the external electronic device over the network using second wireless communication. For example, if a network using second wireless communication for a call connection with an external electronic device is not discovered through search for the second wireless communication for designated third time, the processor 500 may determine that the call connection with the external electronic device is impossible. For example, the designated third time may include a maximum time set to attempt the call connection with the external electronic device. For example, the search for second wireless communication may include a series of operations of searching for whether the network using second wireless communication for the call connection with the external electronic device is present.

According to an embodiment, when determining that a call connection with an external electronic device is impossible over a cellular network and the third network in the state in which a request signal for the call connection is transmitted to the external electronic device, the processor 500 may control the first communication circuitry 510 to perform search for a legacy network. For example, the search (e.g., a hedge scan) for a legacy network may include a series of operations of searching for whether a circuit switching (CS) network for a call connection with an external electronic device is present. For example, when discovering a CS network for a call connection with an external electronic device through search for a legacy network, the processor 500 may perform the call connection with the external electronic device over the CS network.

Figure 7:
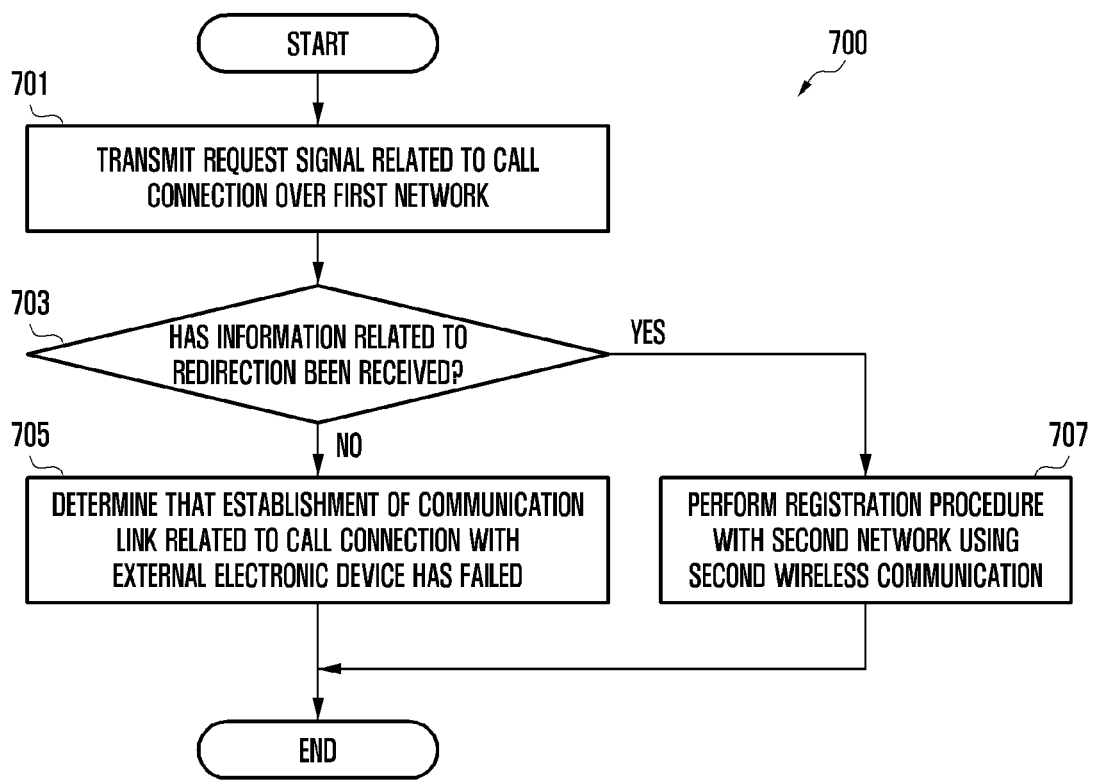
FIG. 7 is a flowchart for determining whether the establishment of a communication link fails based on information related to a redirection in an electronic device according to various embodiments.

FIG. 7 is a flowchart 700 for determining whether the establishment of a communication link fails based on information related to a redirection in an electronic device according to various embodiments. According to an embodiment, at least some of FIG. 7 may include a detailed operation of operation 605 in FIG. 6. In the following embodiment, operations may be sequentially performed, but are not essentially sequentially performed. For example, the sequence of the operations may be changed, and at least two operations may be performed in parallel. For example, the electronic device may be the electronic device 101 in FIG. 1, 2, 3, 4A, 4B, or 5. In the following description, the electronic device may identify whether the establishment of a communication link for a call connection with an external electronic device over a cellular network fails in a situation in which a call connection is requested from the external electronic device. However, the electronic device may identically identify whether the establishment of a communication link for a call connection with an external electronic device fails, even in a situation in which the call connection is requested from the external electronic device.

According to various embodiments referring to FIG. 7, when an electronic device (e.g., the processor 120 in FIG. 1 or the processor 500 in FIG. 5) determines to perform a call connection with an external electronic device (e.g., "Yes" in operation 603 in FIG. 6), in operation 701, the electronic device 101 may transmit a request signal related to the call connection with the external electronic device over the first network using first wireless communication with which the electronic device 101 is registered. According to an embodiment, the processor 500 may control the first communication circuitry 510 to transmit a request signal (e.g., SIP INVITE (MO call)) related to the call connection through a PDU session connected over the first network based on the occurrence of an event related to the request for the call connection with the external electronic device.

According to various embodiments, in operation 703, an electronic device (e.g., the processor 120 or 500) may identify whether information related to a redirection (or IRAT handover) is received from the first network. For example, the information related to the redirection may include frequency information related to second wireless communication with which the electronic device 101 will be registered for the redirection.

According to various embodiments, when not receiving the information related to the redirection (or IRAT handover) from the first network for designated first time (e.g., "No" in operation 703), in operation 705, an electronic device (e.g., the processor 120 or 500) may determine that the establishment of a communication link for the call connection with the external electronic device over a cellular network (e.g., the first network and/or the second network) fails. According to an embodiment, when determining that the establishment of the communication link for the call connection with the external electronic device over the cellular network fails, the processor 500 may determine whether the call connection with the external electronic device is possible over the third network using third wireless communication (e.g., operation 607 in FIG. 6). For example, the designated first time may include timing at which a request signal (e.g., SIP INVITE (MO call)) related to the call connection is transmitted, timing at which a response signal (e.g., a 100 trying or 183 session progress) corresponding to a request signal is received, timing at which a request signal (e.g., SIP INVITE (MT call)) related to the call connection is received and/or an elapse time from timing at which a response signal (e.g., 100 trying) corresponding to a request signal is transmitted.

According to various embodiments, when receiving the information related to the redirection (or IRAT handover) from the first network for the designated first time (e.g., "Yes" in operation 703), in operation 707, an electronic device (e.g., the processor 120 or 500) may perform a registration procedure with the second network using second wireless communication based on the information related to the redirection. According to an embodiment, the processor 500 may control the first communication circuitry 510 to perform search (or a scan) related to second wireless communication, based on frequency information that is included in the information related to the redirection (or IRAT handover) and received from the first network and that is related to the second wireless communication. The processor 500 may control the first communication circuitry 510 to register with the second network discovered through the search related to the second wireless communication.

Figure 8:
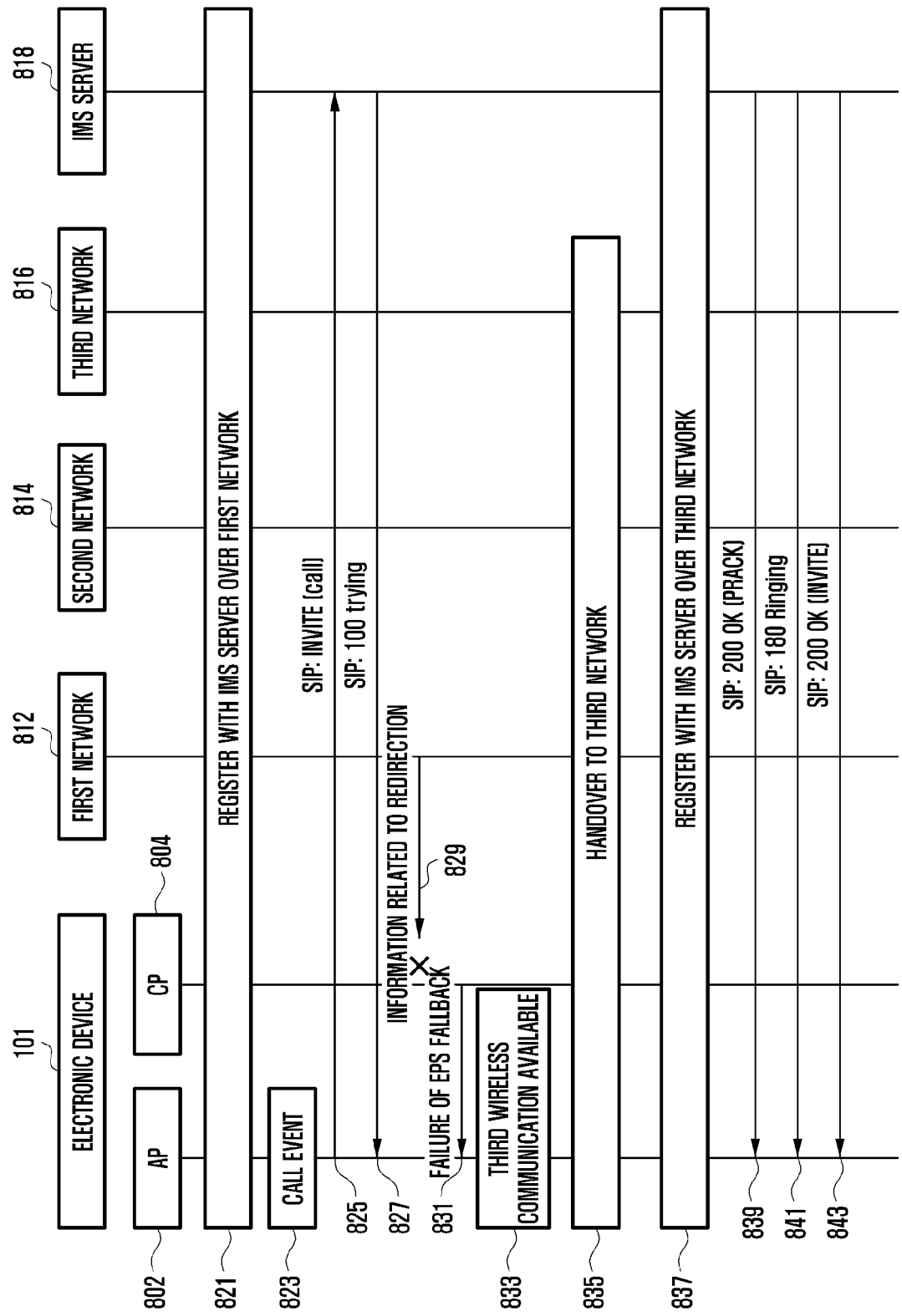
FIG. 8 is an example for connecting a call with an external electronic device by using third wireless communication in the electronic device according to various embodiments.

FIG. 8 is an example for connecting a call with an external electronic device by using third wireless communication in the electronic device according to various embodiments.

According to various embodiments referring to FIG. 8, the electronic device 101 may be registered with an IMS server 818 over the first network using first wireless communication (e.g., NR communication) (operation 821). According to an embodiment, when a call connection mode of the electronic device 101 is configured as a first call connection mode (e.g., a cellular preferred mode), the electronic device 101 (e.g., a communication processor (CP) 804) may check signal quality of a first network 812 using first wireless communication (or a second network 814 using second wireless communication). When the signal quality of the first network 812 satisfies designated first quality, the electronic device 101 (e.g., the CP 804) may be registered with the first network 812 using first wireless communication. For example, the state in which the designated first quality is satisfied may include a state in which the signal quality of the first network 812 is equal to or greater than a first reference intensity (e.g., about −110 dBm). For example, signal quality of a network may include at least one of RSRP, RSRQ, an RSSI, an SINR, a transmission and reception error rate, packet transmission and reception delay, or quality of service (QoS). For example, the call connection mode may be configured based on a call policy of the electronic device 101 and/or a user input. According to an embodiment, the electronic device 101 (e.g., the CP 804) may be registered with the IMS server 818 (e.g., the server 580 in FIG. 5) over the first network 812 with which the electronic device 101 is registered. For example, when registering with the IMS server 818 through the first network 812, the electronic device 101 (e.g., the CP 804) may determine that a PDU session is connected over the first network 812.

According to various embodiments, when an event related to a request for a call connection with an external electronic device occurs (operation 823), the electronic device 101 (e.g., an application processor (AP) 802) may transmit, to the IMS server 818, a request signal (e.g., SIP INVITE (MO call)) related to the call connection through the PDU session connected over the first network 812 (operation 825). The electronic device 101 may receive, from the IMS server 818, a response signal (e.g., 100 trying) corresponding to the request signal related to the call connection through the PDU session (operation 827). For example, the event related to the request for the call connection with the external electronic device may be generated based on the execution of a call application and/or the input of a call button.

According to various embodiments, when not receiving information related to a redirection (or IRAT handover) from the first network 812 for designated first time (operation 829), the electronic device 101 (e.g., the CP 804) may determine that the establishment of a communication link for the call connection with the external electronic device over a cellular network fails. According to an embodiment, when not receiving, from the first network 812, the information related to the redirection (or IRAT handover) for the designated first time (operation 829), the CP 804 may determine that EPS fallback fails. The CP 804 may transmit, to the AP 802, information related to the failure of the EPS fallback (operation 831). For example, the designated first time may include timing at which a request signal (e.g., SIP INVITE (MO call)) related to a call connection is transmitted, timing at which a response signal (e.g., a 100 trying or 183 session progress) corresponding to a request signal is received, timing at which a request signal (e.g., SIP INVITE (MT call)) related to a call connection is received and/or an elapse time from timing at which a response signal (e.g., 100 trying) corresponding to a request signal is transmitted.

According to various embodiments, when determining that the establishment of the communication link for the call connection with the external electronic device over the cellular network fails (e.g., a failure of EPS fallback), the electronic device 101 (e.g., the AP 802) may determine that the call connection with the external electronic device is possible over a third network 816 using third wireless communication (operation 833). According to an embodiment, the electronic device 101 (e.g., the AP 802) may determine that the call connection with the external electronic device is possible over the third network 816 based on at least one of whether the address of an ePDG is obtained, the validity of call context, or signal quality of the third network 816. For example, if the address of an ePDG is obtained, it is determined that call context is valid, and signal quality of the third network 816 satisfies designated quality, the electronic device 101 (e.g., the AP 802) may determine that the call connection with the external electronic device is possible over the third network 816. For example, if the address of an ePDG is not obtained, it is determined that call context is not valid, or it is determined that signal quality of the third network 816 does not satisfy designated quality, the electronic device 101 (e.g., the AP 802) may determine that the call connection with the external electronic device is impossible over the third network 816.

According to various embodiments, when determining that the call connection with the external electronic device is possible over the third network 816 using third wireless communication, the electronic device 101 (e.g., the AP 802) may perform handover to the third network 816 (operation 835). According to an embodiment, the electronic device 101 (e.g., the CP 804) may connect (e.g., form an ePDG tunnel) communication with an ePDG over the third network 816. The electronic device 101 (e.g., the CP 804) may change (or handover) the connection of the PDU session with the IMS server 818 through the ePDG based on the communication connection with the ePDG.

According to various embodiments, the electronic device 101 (e.g., the CP 804) may register (or re-register) with the IMS server 818 over the third network 816 (or the ePDG) (operation 837). According to an embodiment, the electronic device 101 (e.g., the CP 804) may transmit, to the IMS server 818, a p-access-network-information (PANI) message including information related to the third network 816 with which the electronic device 101 is registered.

According to various embodiments, the electronic device 101 may connect a call with the external electronic device over the third network 816. According to an embodiment, the electronic device 101 may receive, from the IMS server 818, a response signal (SIP 200 OK (provisional response acknowledgement (PRACK)) corresponding to the PRACK transmitted to the IMS server 818 for the call connection with the external electronic device (operation 839). For example, the PRACK may include a response signal corresponding to a given response signal (183 session progress) received by the electronic device 101 from the IMS server 818 over the first network 812. According to an embodiment, when receiving, from the IMS server 818, information (e.g., SIP 180 ringing) related to a call waiting state of the external electronic device over the third network 816 (operation 841), the electronic device 101 may play back a ringing tone (e.g., a ringback tone). According to an embodiment, when receiving, from the IMS server 818, information (e.g., SIP 200 OK (invite)) related to the call acceptance of the external electronic device over the third network 816 (operation 843), the electronic device 101 may transmit and/or receive data related to the call with the external electronic device.

Figure 9:
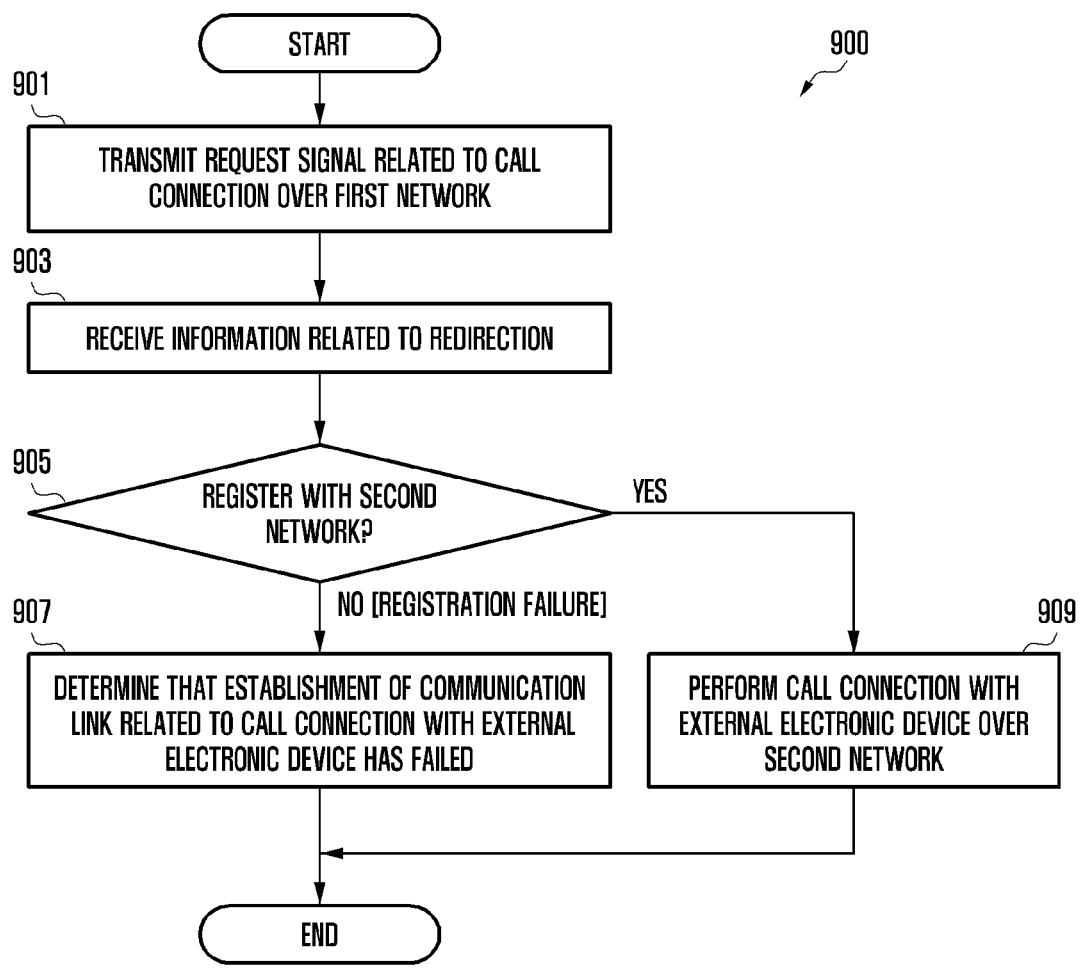
FIG. 9 is a flowchart for determining whether the establishment of a communication link fails based on whether registration with a second network is performed in an electronic device according to various embodiments.

FIG. 9 is a flowchart 900 for determining whether the establishment of a communication link fails based on whether registration with a second network is performed in an electronic device according to various embodiments. According to an embodiment, at least some of FIG. 9 may include a detailed operation of operation 605 in FIG. 6. In the following embodiment, operations may be sequentially performed, but are not essentially sequentially performed. For example, the sequence of the operations may be changed, and at least two operations may be performed in parallel. For example, the electronic device may be the electronic device 101 in FIG. 1, 2, 3, 4A, 4B, or 5. In the following description, the electronic device may identify whether the establishment of a communication link for a call connection with an external electronic device over a cellular network fails in a situation in which the call connection is requested from the external electronic device. However, the electronic device may identically identify whether the establishment of a communication link for a call connection with an external electronic device fails, even in a situation in which the call connection is requested from the external electronic device.

According to various embodiments referring to FIG. 9, when determining to perform a call connection with an external electronic device (e.g., "Yes" in operation 603 in FIG. 6), in operation 901, an electronic device (e.g., the processor 120 in FIG. 1 or the processor 500 in FIG. 5) may transmit a request signal related to the call connection with the external electronic device over the first network using first wireless communication with which the electronic device 101 is registered. According to an embodiment, when an event related to the request for the call connection with the external electronic device occurs, the processor 500 may control the first communication circuitry 510 to transmit a request signal (e.g., SIP INVITE (MO call)) related to the call connection with the external electronic device through a PDU session connected over the first network.

According to various embodiments, in operation 903, an electronic device (e.g., the processor 120 or 500) may receive, from the first network, information related to a redirection (or IRAT handover). According to an embodiment, the processor 500 may receive, from the first network, the information related to the redirection (or IRAT handover) within designated first time. For example, the information related to the redirection may include frequency information related to second wireless communication with which the electronic device 101 will be registered for the redirection.

According to various embodiments, in operation 905, an electronic device (e.g., the processor 120 or 500) may determine whether the electronic device is capable of registering with the second network using second wireless communication based on the information related to the redirection. According to an embodiment, the processor 500 may control the first communication circuitry 510 to perform search (or a scan) related to the second wireless communication, based on the frequency information that is included in the information related to the redirection (or IRAT handover) and received from the first network and that is related to the second wireless communication. The processor 500 may control the first communication circuitry 510 to perform a registration procedure with the second network discovered through the search related to the second wireless communication.

According to various embodiments, when determining that the registration with the second network fails (e.g., "No" in operation 905), in operation 907, an electronic device (e.g., the processor 120 or 500) may determine that the establishment of a communication link for the call connection with the external electronic device over a cellular network (e.g., the first network and/or the second network) fails. According to an embodiment, when not discovering the second network through the search related to the second wireless communication based on the information related to the redirection (or IRAT handover), the processor 500 may determine that the registration with the second network fails. According to an embodiment, when failing in a random-access channel (RACH) toward the second network using second wireless communication discovered through the search related to the second wireless communication, the processor 500 may determine that the registration with the second network fails. According to an embodiment, when failing in a tracking area update (TAU) toward the second network using second wireless communication discovered through the search related to the second wireless communication, the processor 500 may determine that the registration with the second network fails. For example, when receiving, from the second network, an Attach Reject message including information of a network failure (e.g., cause #17) or congestion (e.g., cause #22) through the first communication circuitry 510, the processor 500 may determine that a TAU toward the second network fails. According to an embodiment, when determining that the establishment of a communication link for the call connection with the external electronic device over the cellular network fails, the processor 500 may identify whether the call connection with the external electronic device is possible over the third network using third wireless communication (e.g., operation 607 in FIG. 6).

According to various embodiments, when registering with the second network (e.g., "Yes" in operation 905), an electronic device (e.g., the processor 120 or 500), may connect a call with the external electronic device over the second network in operation 909. According to an embodiment, when the electronic device is registered with the second network using second wireless communication based on information related to a redirection (or IRAT handover) received from the first network, the processor 500 may control the first communication circuitry 510 to change a PDU session to the second network. The processor 500 may control the first communication circuitry 510 to connect a call with the external electronic device through a PDU session established over the second network.

Figure 10:
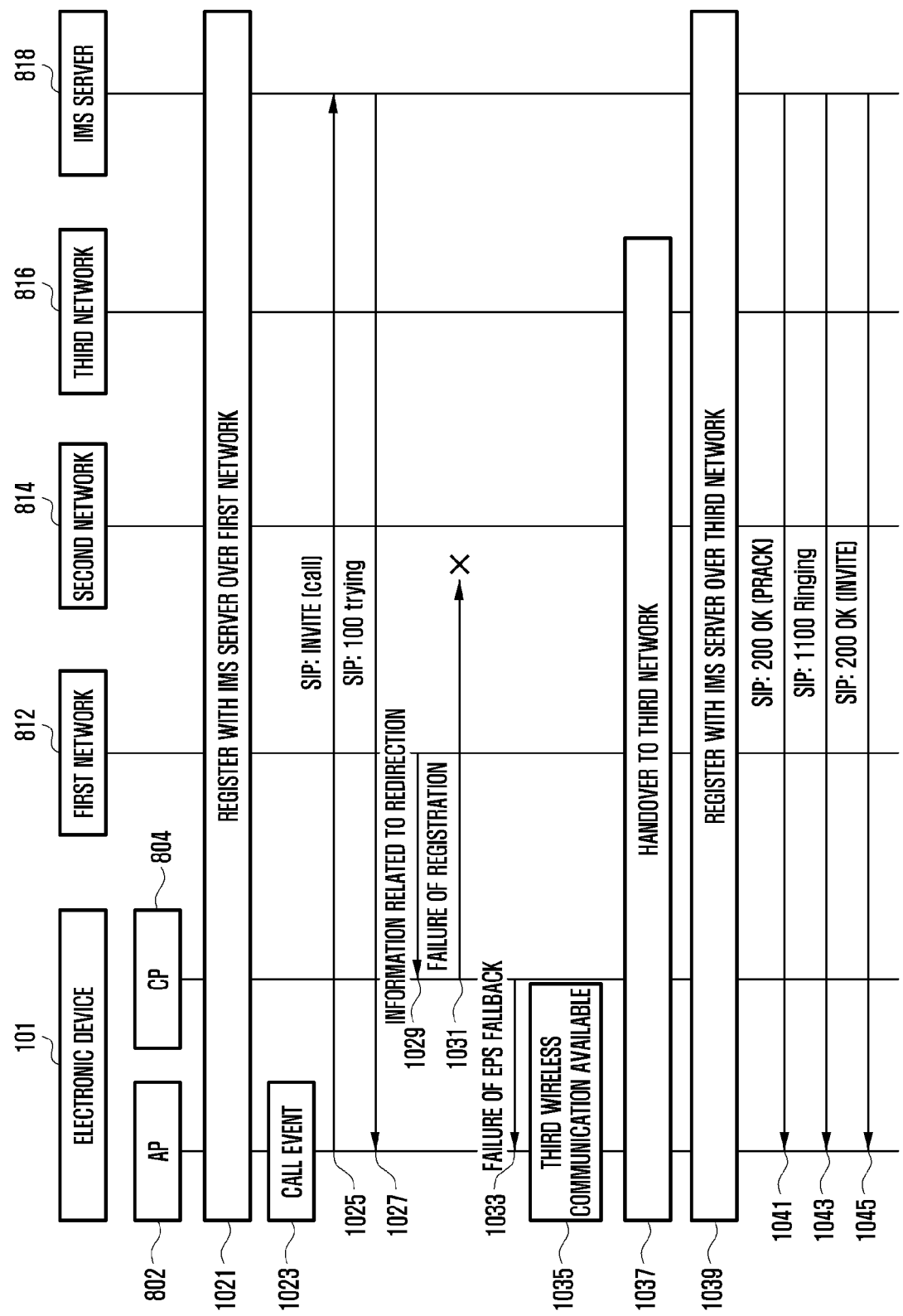
FIG. 10 is an example for connecting a call with an external electronic device by using third wireless communication in the electronic device according to various embodiments.

FIG. 10 is an example for connecting a call with an external electronic device by using third wireless communication in the electronic device according to various embodiments.

According to various embodiments referring to FIG. 10, the electronic device 101 may be registered with the IMS server 818 over the first network using first wireless communication (e.g., NR communication) (operation 1021). According to an embodiment, when signal quality of the first network 812 satisfies designated first quality in the state in which a call connection mode of the electronic device 101 is configured as a first call connection mode (e.g., a cellular preferred mode), the electronic device 101 (e.g., the CP 804) may be registered with the first network 812 using first wireless communication. According to an embodiment, the electronic device 101 (e.g., the CP 804) may be registered with the IMS server 818 (e.g., the server 580 in FIG. 5) over the first network 812 with which the electronic device 101 is registered. For example, the registration with the IMS server 818 over the first network 812 may include a state in which a PDU session is connected over the first network 812.

According to various embodiments, when an event related to a request for a call connection with an external electronic device occurs (operation 1023), the electronic device 101 (e.g., the AP 802) may transmit, to the IMS server 818, a request signal (e.g., SIP INVITE (MO call)) related to the call connection through a PDU session connected over the first network 812 (operation 1025). The electronic device 101 may receive, from the IMS server 818, a response signal (e.g., 100 trying) corresponding to the request signal related to the call connection through the PDU session (operation 1027).

According to various embodiments, when receiving, from the first network 812, information related to a redirection (or IRAT handover) within designated first time (operation 1029), the electronic device 101 (e.g., the CP 804) may perform a registration procedure with the second network 814. According to an embodiment, the electronic device 101 (e.g., the CP 804) may perform search (or a scan) related to second wireless communication, based on frequency information that is included in the information related to the redirection (or IRAT handover) and received from the first network 812 and that is related to the second wireless communication. The electronic device 101 (e.g., the CP 804) may perform a registration procedure with the second network 814 discovered through search related to the second wireless communication.

According to various embodiments, when failing in the registration with the second network 814 (operation 1031), the electronic device 101 (e.g., the CP 804) may determine that the establishment of a communication link for the call connection with the external electronic device over a cellular network fails. According to an embodiment, when not discovering the second network 814 through the search related to the second wireless communication based on the information related to the redirection (or IRAT handover), the CP 804 may determine that the registration with the second network 814 fails. According to an embodiment, when failing in a RACH toward the second network 814 discovered through the search related to the second wireless communication, the CP 804 may determine that the registration with the second network 814 fails. According to an embodiment, when failing in a TAU toward the second network 814 discovered through the search related to the second wireless communication, the CP 804 may determine that the registration with the second network 814 fails. According to an embodiment, when determining that the registration with the second network 814 fails (operation 1031), the CP 804 may determine that EPS fallback fails. The CP 804 may transmit, to the AP 802, information related to the failure of the EPS fallback (operation 1033).

According to various embodiments, when determining that the establishment of a communication link for the call connection with the external electronic device over the cellular network fails (e.g., a failure of EPS fallback), the electronic device 101 (e.g., the AP 802) may determine that the call connection with the external electronic device is possible over the third network 816 using third wireless communication (operation 1035). According to an embodiment, the electronic device 101 (e.g., the AP 802) may determine that the call connection with the external electronic device is possible over the third network 816 based on at least one of whether the address of an ePDG is obtained, the validity of call context, or signal quality of the third network 816. For example, if the address of an ePDG is obtained, it is determined that call context is valid, and signal quality of the third network 816 satisfies designated quality, the electronic device 101 (e.g., the AP 802) may determine that the call connection with the external electronic device is possible over the third network 816.

According to various embodiments, when determining that the call connection with the external electronic device is possible over the third network 816 using third wireless communication, the electronic device 101 (e.g., the AP 802) may perform handover to the third network 816 (operation 1037). According to an embodiment, the electronic device 101 (e.g., the CP 804) may change (or handover) the connection of a PDU session with the IMS server 818 through the ePDG based on a communication connection with the ePDG.

According to various embodiments, the electronic device 101 (e.g., the CP 804) may register (or re-register) with the IMS server 818 over the third network 816 (or the ePDG) (operation 1039).

According to various embodiments, the electronic device 101 may connect a call with the external electronic device over the third network 816 (operation 1041 to operation 1045). According to an embodiment, operation 1041 to operation 1045 of connecting, by the electronic device 101, a call with the external electronic device are the same as operation 839 to operation 843 in FIG. 8, and detailed descriptions thereof are omitted.

Figure 11:
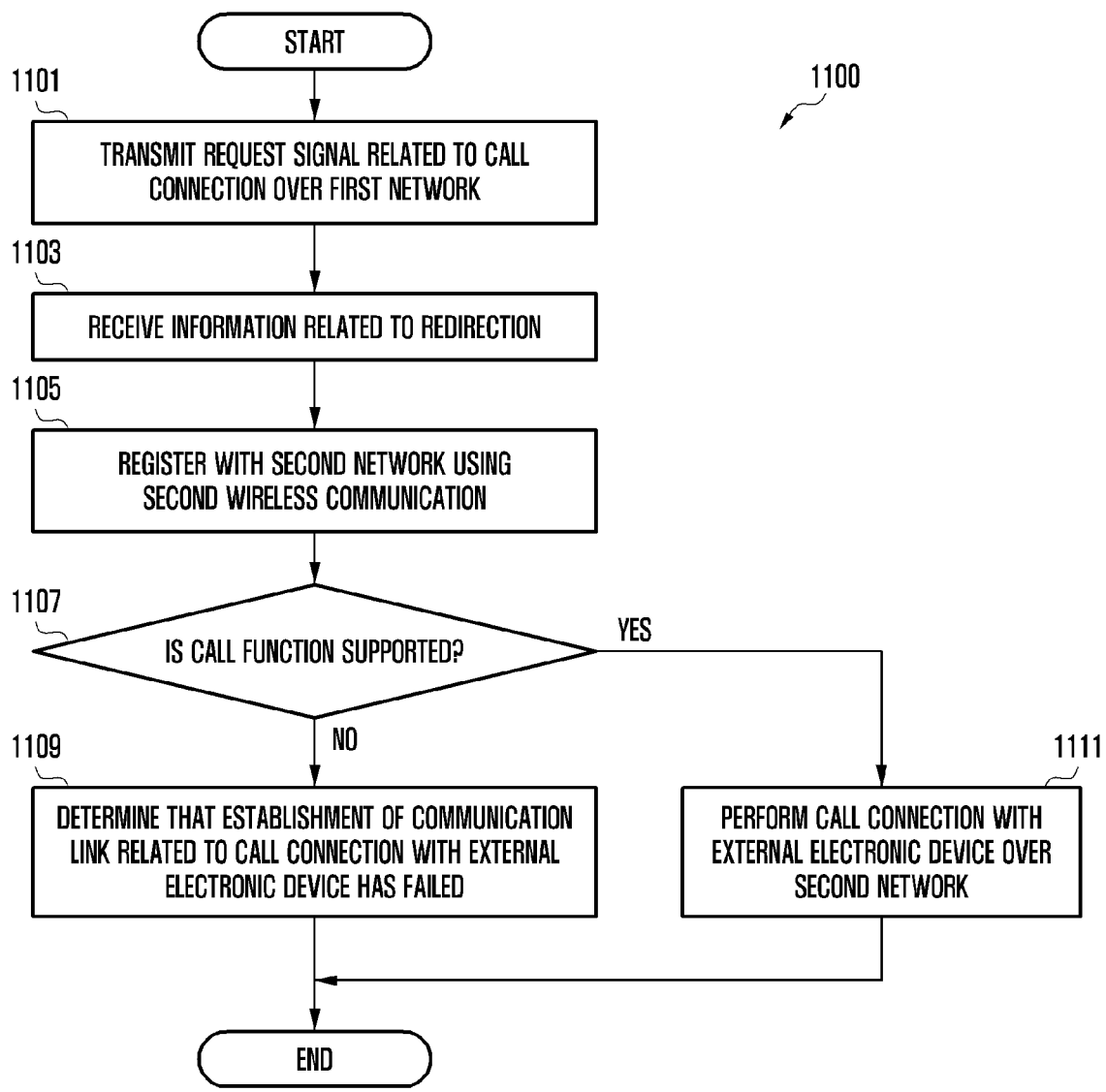
FIG. 11 is a flowchart for determining whether the establishment of a communication link fails based on whether a call with the second network is supported in an electronic device according to various embodiments.

FIG. 11 is a flowchart 1100 for determining whether the establishment of a communication link fails based on whether a call with the second network is supported in an electronic device according to various embodiments. According to an embodiment, at least some of FIG. 11 may include a detailed operation of operation 605 in FIG. 6. In the following embodiment, operations may be sequentially performed, but are not essentially sequentially performed. For example, the sequence of the operations may be changed, and at least two operations may be performed in parallel. For example, the electronic device may be the electronic device 101 in FIG. 1, 2, 3, 4A, 4B, or 5. In the following description, the electronic device may identify whether the establishment of a communication link for a call connection with an external electronic device over a cellular network fails in a situation in which the call connection is requested from the external electronic device. However, the electronic device may identically identify whether the establishment of a communication link for a call connection with an external electronic device fails, even in a situation in which the call connection is requested from the external electronic device.

According to various embodiments referring to FIG. 11, when determining to perform a call connection with an external electronic device (e.g., "Yes" in operation 603 in FIG. 6), in operation 1101, an electronic device (e.g., the processor 120 in FIG. 1 or the processor 500 in FIG. 5) may transmit a request signal related to the call connection with the external electronic device over the first network using first wireless communication with which the electronic device 101 is registered. According to an embodiment, the request signal (e.g., SIP INVITE (MO call)) related to the call connection with the external electronic device may be transmitted to an IMS server through a PDU session connected over the first network, based on the occurrence of an event related to the request for the call connection with the external electronic device.

According to various embodiments, in operation 1103, an electronic device (e.g., the processor 120 or 500) may receive, from the first network, information related to a redirection (or IRAT handover). According to an embodiment, the processor 500 may receive, from the first network, the information related to the redirection (or IRAT handover) within designated first time. For example, the information related to the redirection may include frequency information related to second wireless communication with which the electronic device 101 will be registered for the redirection.

According to various embodiments, in operation 1105, an electronic device (e.g., the processor 120 or 500) may be registered with the second network using second wireless communication based on the information related to the redirection. According to an embodiment, the processor 500 may control the first communication circuitry 510 to perform search (or a scan) related to the second wireless communication, based on the frequency information that is included in the information related to the redirection (or IRAT handover) and received from the first network and that is related to the second wireless communication. The processor 500 may control the first communication circuitry 510 to perform a registration procedure with the second network discovered through the search related to the second wireless communication.

According to various embodiments, in operation 1107, an electronic device (e.g., the processor 120 or 500) may identify whether the second network supports a call function (e.g., VoLTE). According to an embodiment, whether the second network supports the call function may be identified through a function negotiation between the electronic device 101 and the second network.

According to various embodiments, if the second network does not support the call function (e.g., "No" in operation 1107), in operation 1109, an electronic device (e.g., the processor 120 or 500) may determine that the establishment of a communication link for the call connection with the external electronic device over a cellular network (e.g., the first network and/or the second network) fails. According to an embodiment, if a cellular network (e.g., the first network and/or the second network) does not support a call function using an IMS structure, the processor 500 may identify whether the call connection with the external electronic device is possible over the third network using third wireless communication (e.g., operation 607 in FIG. 6).

According to various embodiments, when the second network supports the call function (e.g., "Yes" in operation 1107), in operation 1111, an electronic device (e.g., the processor 120 or 500) may connect a call with the external electronic device over the second network. According to an embodiment, when the electronic device is registered with the second network using second wireless communication based on the information related to the redirection (or IRAT handover) received from the first network, the processor 500 may control the first communication circuitry 510 to change the PDU session to the second network. The processor 500 may control the first communication circuitry 510 to connect a call with the external electronic device through a PDU session established over the second network.

According to various embodiments, the electronic device 101 may determine whether the second network supports a call function using an IMS structure based on a system information block received from the second network. According to an embodiment, when discovering the second network through search related to second wireless communication based on the information related to the redirection (or IRAT handover), the processor 500 may identify whether a call function (e.g., a multimedia telephony service (MMTEL)) is supported in access barring (ACB) of a system information block (e.g., a system information block (SIB) 1) received from the second network. In this case, in operation 1105 of FIG. 11, at least some of the registration procedure with the second network may be omitted.

Figure 12:
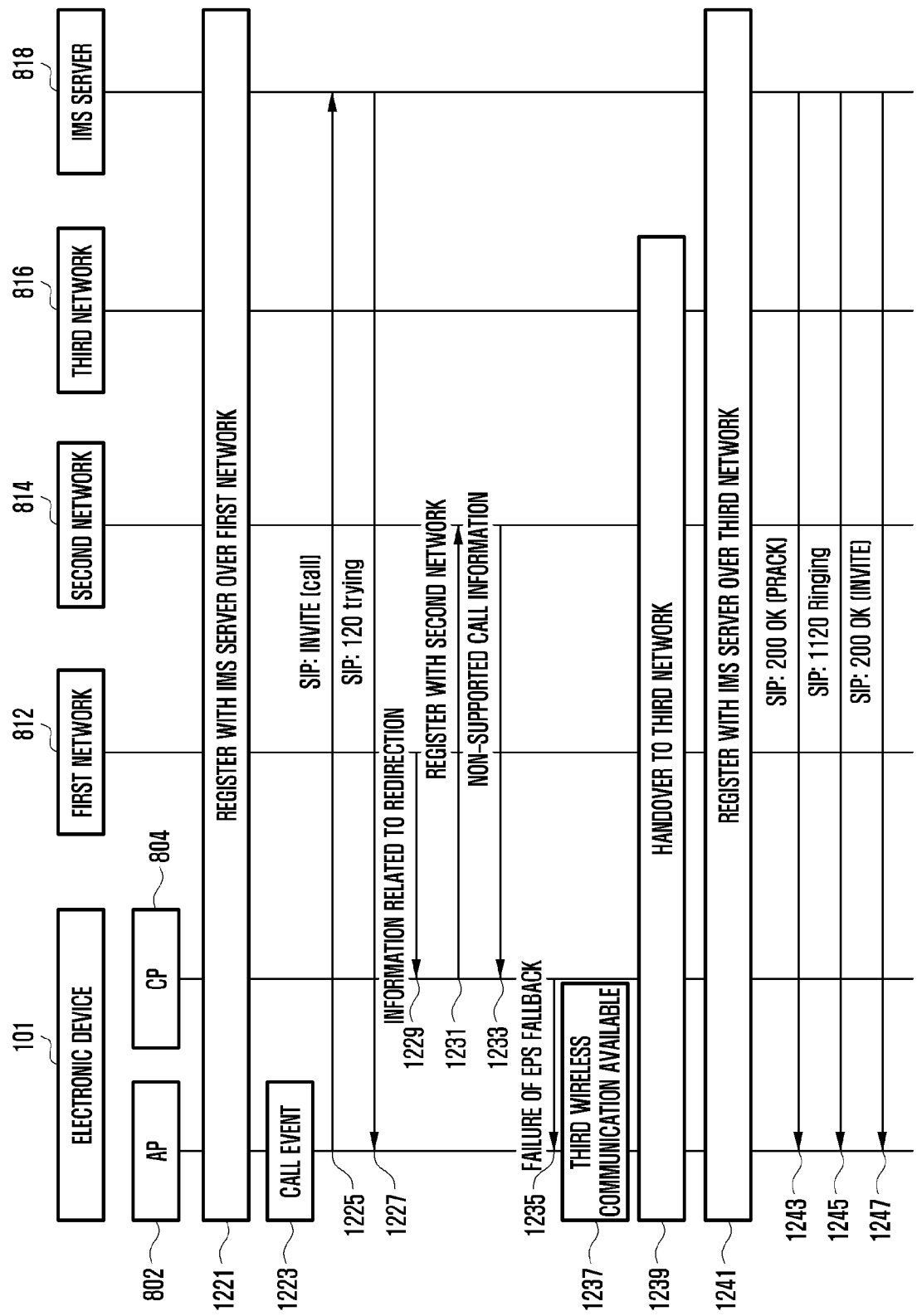
FIG. 12 is an example for connecting a call with an external electronic device by using third wireless communication in the electronic device according to various embodiments.

FIG. 12 is an example for connecting a call with an external electronic device by using third wireless communication in the electronic device according to various embodiments.

According to various embodiments referring to FIG. 12, the electronic device 101 may be registered with the IMS server 818 over the first network using first wireless communication (e.g., NR communication) (operation 1221). According to an embodiment, when signal quality of the first network 812 satisfies designated first quality in the state in which a call connection mode of the electronic device 101 is configured as a first call connection mode (e.g., a cellular preferred mode), the electronic device 101 (e.g., the CP 804) may be registered with the first network 812 using first wireless communication. For example, if the first network 812 is operated independently of the second network 814 (e.g., stand-alone), the electronic device 101 may preferentially register with the first network 812. According to an embodiment, the electronic device 101 (e.g., the CP 804) may be registered with the IMS server 818 (e.g., the server 580 in FIG. 5) over the first network 812 with which the electronic device 101 is registered.

According to various embodiments, when an event related to a request for a call connection with an external electronic device occurs (operation 1223), the electronic device 101 (e.g., the AP 802) may transmit, to the IMS server 818, a request signal (e.g., SIP INVITE (MO call)) related to the call connection through a PDU session connected over the first network 812 (operation 1225). The electronic device 101 may receive, from the IMS server 818, a response signal (e.g., 100 trying) corresponding to the request signal related to the call connection through the PDU session (operation 1227).

According to various embodiments, when receiving, from the first network 812, information related to a redirection (or IRAT handover) within designated first time (operation 1229), the electronic device 101 (e.g., the CP 804) may be registered with the second network 814 (operation 1231). According to an embodiment, the electronic device 101 (e.g., the CP 804) may perform search (or a scan) related to second wireless communication, based on frequency information that is included in the information related to the redirection (or IRAT handover) and received from the first network 812 and that is related to the second wireless communication. The electronic device 101 (e.g., the CP 804) may perform a registration procedure with the second network 814 discovered through the search related to the second wireless communication.

According to various embodiments, the electronic device 101 (e.g., the CP 804) may receive, from the second network 814, information related to a call function (operation 1233). According to an embodiment, the electronic device 101 (e.g., the CP 804) may obtain information related to the call function of the second network 814 through a function negotiation with the second network 814.

According to various embodiments, if the second network 814 does not support the call function (operation 1233), the electronic device 101 (e.g., the CP 804) may determine that the establishment of a communication link for the call connection with the external electronic device over a cellular network fails. According to an embodiment, if the second network 814 does not support a call function (e.g., VoLTE) using an IMS structure, the CP 804 may determine that EPS fallback fails. The CP 804 may transmit, to the AP 802, information related to the failure of the EPS fallback (operation 1235).

According to various embodiments, when determining that the establishment of the communication link for the call connection with the external electronic device over the cellular network fails (e.g., a failure of EPS fallback), the electronic device 101 (e.g., the AP 802) may determine that the call connection with the external electronic device is possible over the third network 816 using third wireless communication (operation 1237). According to an embodiment, if the address of an ePDG is obtained, it is determined that call context is valid, and signal quality of the third network 816 satisfies designated quality, the electronic device 101 (e.g., the AP 802) may determine that the call connection with the external electronic device is possible over the third network 816.

According to various embodiments, when determining that the call connection with the external electronic device is possible over the third network 816 using third wireless communication, the electronic device 101 (e.g., the AP 802) may perform handover to the third network 816 (operation 1239). According to an embodiment, the electronic device 101 (e.g., the CP 804) may change (or handover) the connection of the PDU session with the IMS server 818 through the ePDG based on the communication connection with the ePDG.

According to various embodiments, the electronic device 101 (e.g., the CP 804) may register (or re-register) with the IMS server 818 over the third network 816 (or the ePDG) (operation 1241).

According to various embodiments, the electronic device 101 may connect a call with the external electronic device over the third network 816 (operation 1243 to operation 1247). According to an embodiment, operation 1243 to operation 1247 for enabling the electronic device 101 to connect the call with the external electronic device are the same as operation 839 to operation 843 in FIG. 8, and detailed descriptions thereof are omitted.

Figure 13:
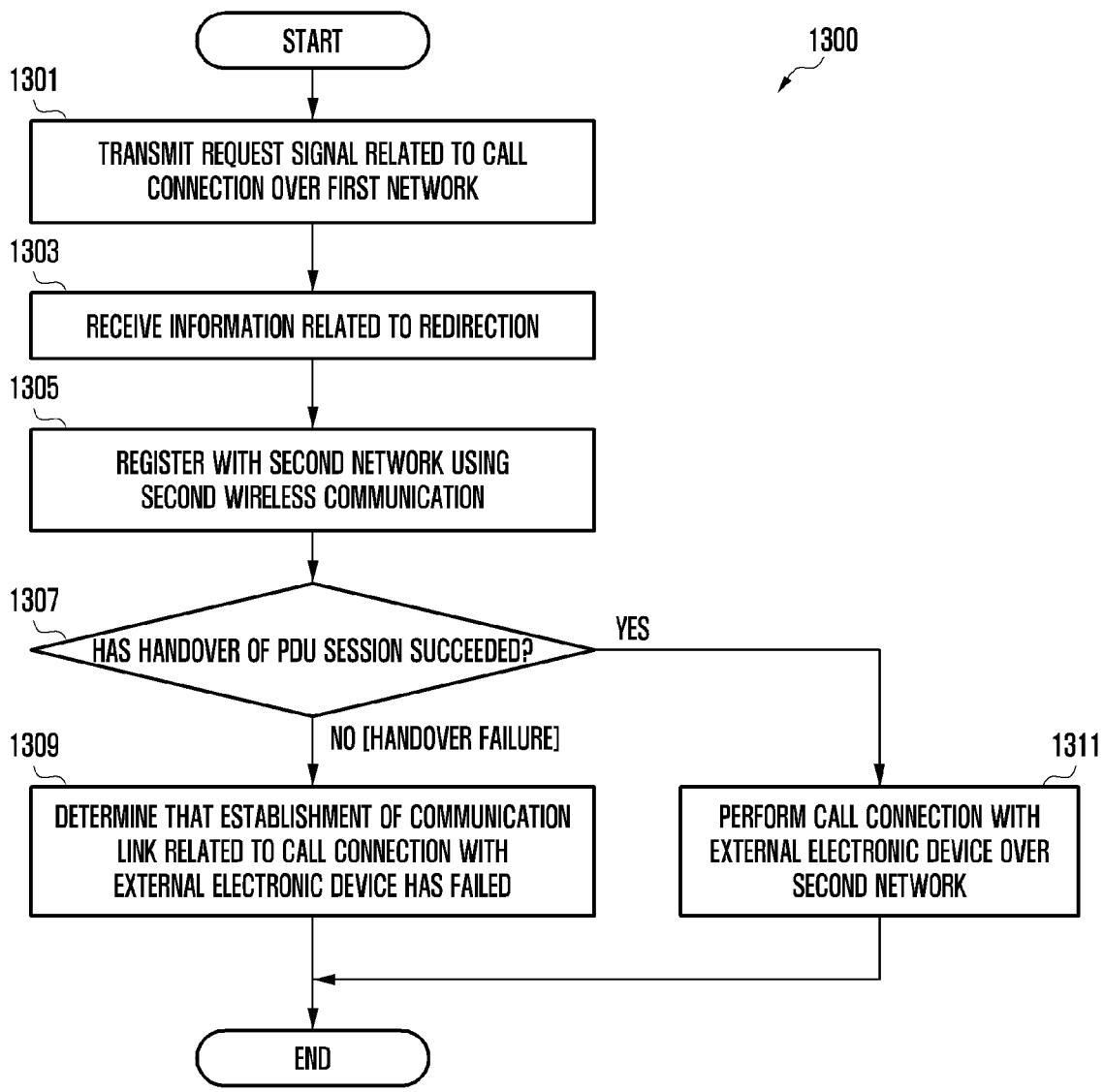
FIG. 13 is a flowchart for determining whether the establishment of a communication link fails based on handover of a PDN session in the electronic device according to various embodiments.

FIG. 13 is a flowchart 1300 for determining whether the establishment of a communication link fails based on handover of a PDN session in the electronic device according to various embodiments. According to an embodiment, at least some of FIG. 13 may include a detailed operation of operation 605 in FIG. 6. In the following embodiment, operations may be sequentially performed, but are not essentially sequentially performed. For example, the sequence of the operations may be changed, and at least two operations may be performed in parallel. For example, the electronic device may be the electronic device 101 in FIG. 1, 2, 3, 4A, 4B, or 5. In the following description, the electronic device may identify whether the establishment of a communication link for a call connection with an external electronic device over a cellular network fails in a situation in which the call connection is requested from the external electronic device. However, the electronic device may identically identify whether the establishment of a communication link for a call connection with an external electronic device fails, even in a situation in which the call connection is requested from the external electronic device.

According to various embodiments referring to FIG. 13, when determining to perform a call connection with an external electronic device (e.g., "Yes" in operation 603 in FIG. 6), in operation 1301, an electronic device (e.g., the processor 120 in FIG. 1 or the processor 500 in FIG. 5) may transmit a request signal related to the call connection with the external electronic device over the first network using first wireless communication with which the electronic device 101 is registered. According to an embodiment, the request signal (e.g., SIP INVITE (MO call)) related to the call connection with the external electronic device may be transmitted to an IMS server through a PDU session connected over the first network, based on the occurrence of an event related to the request for the call connection with the external electronic device.

According to various embodiments, in operation 1303, an electronic device (e.g., the processor 120 or 500) may receive, from the first network, information related to a redirection (or IRAT handover). According to an embodiment, the processor 500 may receive, from the first network, the information related to the redirection (or IRAT handover) within designated first time. For example, the information related to the redirection may include frequency information related to second wireless communication with which the electronic device 101 will be registered for the redirection.

According to various embodiments, in operation 1305, an electronic device (e.g., the processor 120 or 500) may be registered with the second network using second wireless communication based on the information related to the redirection. According to an embodiment, the processor 500 may control the first communication circuitry 510 to perform search (or a scan) related to the second wireless communication, based on the frequency information that is included in the information related to the redirection (or IRAT handover) and received from the first network and that is related to the second wireless communication. The processor 500 may control the first communication circuitry 510 to perform a registration procedure with the second network discovered through the search related to the second wireless communication.

According to various embodiments, in operation 1307, an electronic device (e.g., the processor 120 or 500) may identify whether the handover of a PDU session to the second network with which the electronic device 101 is registered succeeds.

According to various embodiments, when the handover of the PDU session to the second network fails (e.g., "No" in operation 1307), in operation 1309, an electronic device (e.g., the processor 120 or 500) may determine that the establishment of a communication link for a call connection with an external electronic device fails over a cellular network (e.g., the first network and/or the second network). According to an embodiment, when the handover of the PDU session to the second network fails, the processor 500 may identify whether the call connection with the external electronic device is possible over the third network using third wireless communication (e.g., operation 607 in FIG. 6).

According to various embodiments, when an electronic device (e.g., the processor 120 or 500) performs the handover of the PDU session to the second network (e.g., "Yes" in operation 1307), in operation 1311, the electronic device may connect a call with the external electronic device through the PDU session changed to the second network. According to an embodiment, if the electronic device is registered with the second network using second wireless communication based on information related to a redirection (or IRAT handover) received from the first network, the processor 500 may control the first communication circuitry 510 to change the PDU session to the second network. The processor 500 may control the first communication circuitry 510 to connect a call with the external electronic device through a PDU session established over the second network.

Figure 14:
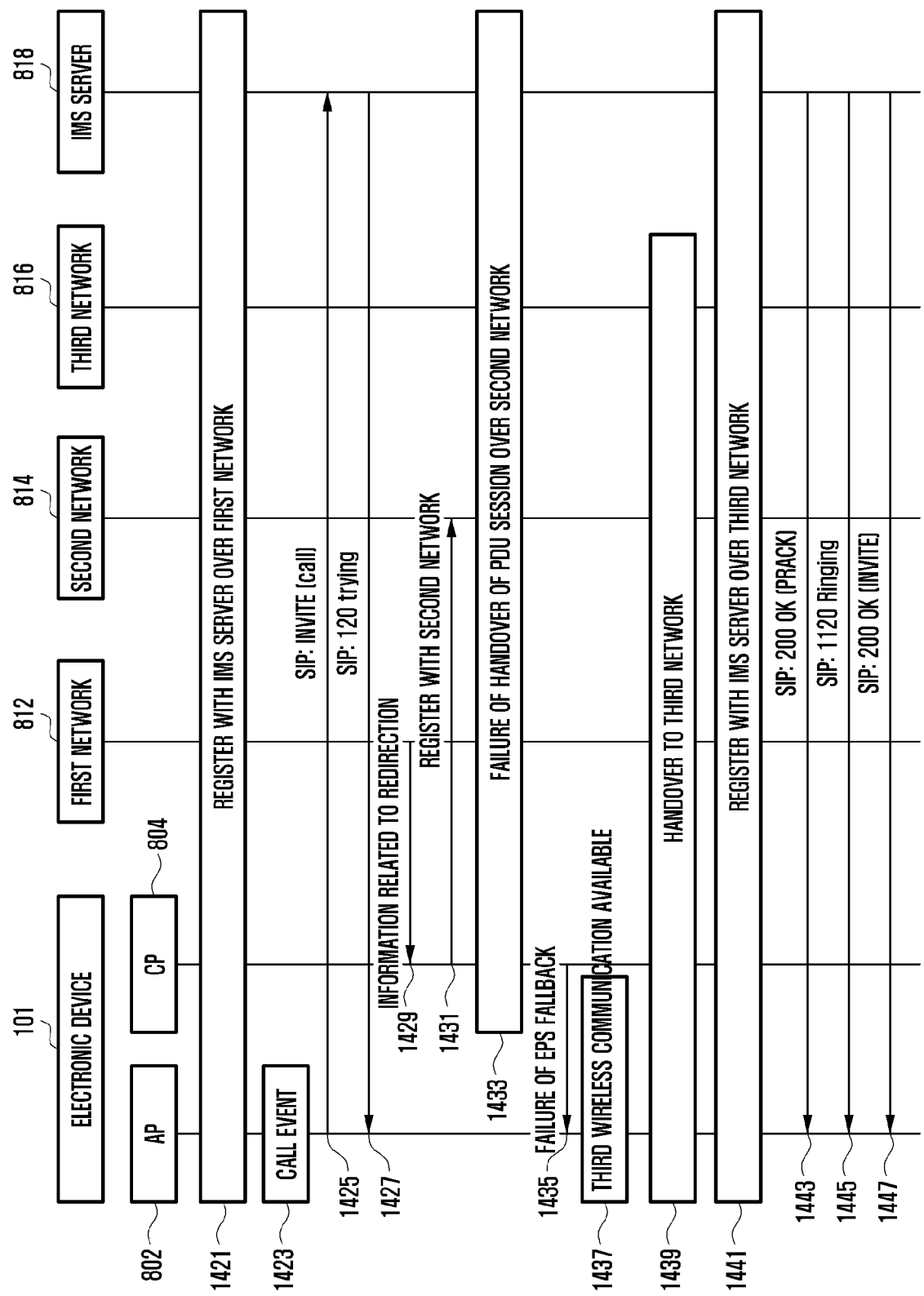
FIG. 14 is an example for connecting a call with an external electronic device by using third wireless communication in the electronic device according to various embodiments.

FIG. 14 is an example for connecting a call with an external electronic device by using third wireless communication in the electronic device according to various embodiments.

According to various embodiments referring to FIG. 14, the electronic device 101 may be registered with the IMS server 818 over the first network using first wireless communication (e.g., NR communication) (operation 1421). According to an embodiment, if a call connection mode of the electronic device 101 is configured as a first call connection mode (e.g., a cellular preferred mode) and the first network 812 is operated independently of the second network 814 (e.g., stand-alone), the electronic device 101 (e.g., the CP 804) may preferentially register with the first network 812. According to an embodiment, the electronic device 101 (e.g., the CP 804) may be registered with the IMS server 818 (e.g., the server 580 in FIG. 5) over the first network 812 with which the electronic device 101 is registered.

According to various embodiments, when an event related to a request for a call connection with an external electronic device occurs (operation 1423), the electronic device 101 (e.g., the AP 802) may transmit, to the IMS server 818, a request signal (e.g., SIP INVITE (MO call)) related to the call connection through a PDU session connected over the first network 812 (operation 1425). The electronic device 101 may receive, from the IMS server 818, a response signal (e.g., 100 trying) corresponding to the request signal related to the call connection through the PDU session (operation 1427).

According to various embodiments, when receiving, from the first network 812, information related to a redirection (or IRAT handover) within designated first time (operation 1429), the electronic device 101 (e.g., the CP 804) may be registered with the second network 814 (operation 1431). According to an embodiment, the electronic device 101 (e.g., the CP 804) may perform search (or a scan) related to second wireless communication, based on frequency information that is included in the information related to the redirection (or IRAT handover) and received from the first network 812 and that is related to the second wireless communication. The electronic device 101 (e.g., the CP 804) may perform a registration procedure with the second network 814 discovered through the search related to the second wireless communication.

According to various embodiments, when failing in a change (or handover) of the PDU session to the second network 814 (operation 1433), the electronic device 101 (e.g., the CP 804) may determine that the establishment of a communication link for the call connection with the external electronic device over a cellular network fails. According to an embodiment, when the handover of the PDU session to the second network 814 fails, the CP 804 may determine that EPS fallback fails. The CP 804 may transmit, to the AP 802, information related to the failure of the EPS fallback (operation 1435).

According to various embodiments, when determining that the establishment of a communication link for the call connection with the external electronic device over a cellular network fails (e.g., a failure of EPS fallback), the electronic device 101 (e.g., the AP 802) may determine that the call connection with the external electronic device is possible over the third network 816 using third wireless communication (operation 1437). According to an embodiment, if the address of an ePDG is obtained, it is determined that call context is valid, and signal quality of the third network 816 satisfies designated quality, the electronic device 101 (e.g., the AP 802) may determine that the call connection with the external electronic device is possible over the third network 816.

According to various embodiments, when determining that the call connection with the external electronic device is possible over the third network 816 using third wireless communication, the electronic device 101 (e.g., the AP 802) may perform handover to the third network 816 (operation 1439). According to an embodiment, the electronic device 101 (e.g., the CP 804) may change (or handover) the connection of the PDU session to the IMS server 818 through the ePDG based on the communication connection with the ePDG.

According to various embodiments, the electronic device 101 (e.g., the CP 804) may register (or re-register) with the IMS server 818 over the third network 816 (or the ePDG) (operation 1441).

According to various embodiments, the electronic device 101 may connect a call with the external electronic device over the third network 816 (operation 1443 to operation 1447). According to an embodiment, operation 1443 to operation 1447 for enabling the electronic device 101 to connect the call with the external electronic device are the same as operation 839 to operation 843 in FIG. 8, and detailed descriptions thereof are omitted.

Figure 15:
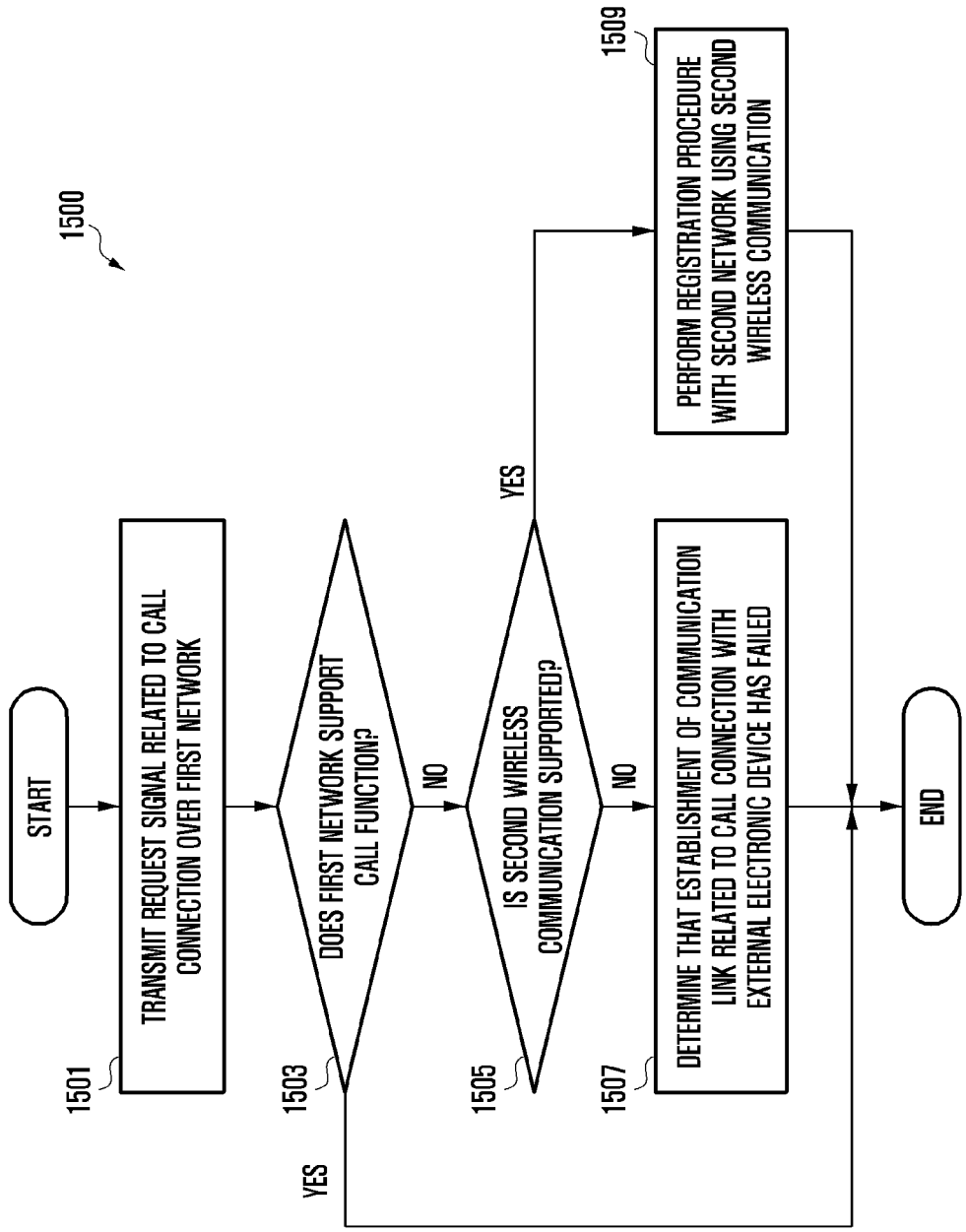
FIG. 15 is a flowchart for determining whether the establishment of a communication link fails based on whether second wireless communication is supported in an electronic device according to various embodiments.

FIG. 15 is a flowchart 1500 for determining whether the establishment of a communication link fails based on whether second wireless communication is supported in an electronic device according to various embodiments. According to an embodiment, at least some of FIG. 15 may include a detailed operation of operation 605 in FIG. 6. In the following embodiment, operations may be sequentially performed, but are not essentially sequentially performed. For example, the sequence of the operations may be changed, and at least two operations may be performed in parallel. For example, the electronic device may be the electronic device 101 in FIG. 1, 2, 3, 4A, 4B, or 5. In the following description, the electronic device may identify whether the establishment of a communication link for a call connection with an external electronic device over a cellular network fails in a situation in which the call connection is requested from the external electronic device. However, the electronic device may identically identify whether the establishment of a communication link for a call connection with an external electronic device fails, even in a situation in which the call connection is requested from the external electronic device.

According to various embodiments referring to FIG. 15, when determining to perform a call connection with an external electronic device (e.g., "Yes" in operation 603 in FIG. 6), in operation 1501, an electronic device (e.g., the processor 120 in FIG. 1 or the processor 500 in FIG. 5) may transmit a request signal related to the call connection with the external electronic device over the first network using first wireless communication with which the electronic device 101 is registered. According to an embodiment, the processor 500 may control the first communication circuitry 510 to transmit a request signal (e.g., SIP INVITE (MO call)) related to the call connection through a PDU session connected over the first network, based on the occurrence of an event related to the request for the call connection with the external electronic device.

According to various embodiments, in operation 1503, an electronic device (e.g., the processor 120 or 500) may identify whether the first network supports a call function. According to an embodiment, the processor 500 may identify whether the first network using wireless communication supports the call function, based on a call connection history using a network used for the electronic device 101 to register with an IMS server and/or the first network using wireless communication. According to an embodiment, when the electronic device 101 is registered with the IMS server over the second network using second wireless communication (e.g., LTE) at timing at which the occurrence of an event related to the call function is detected, the processor 500 may determine that the first network does not support the call function. According to an embodiment, if a call connection history (or a call success history) using the first network using first wireless communication is not present in the electronic device 101, the processor 500 may determine that the first network does not support the call function. According to an embodiment, if the call connection history (or the call success history) using the first network is present in the electronic device 101, the processor 500 may determine that the first network supports the call function.

According to various embodiments, if the first network supports the call function (e.g., "Yes" in operation 1503), an electronic device (e.g., the processor 120 or 500) may terminate an embodiment for determining whether the establishment of a communication link fails. According to an embodiment, if the first network supports the call function, the processor 500 may perform the call connection with the external electronic device over the first network.

According to various embodiments, if the first network does not support the call function (e.g., "No" in operation 1503), in operation 1505, an electronic device (e.g., the processor 120 or 500) may identify whether the electronic device 101 supports second wireless communication. According to an embodiment, if the electronic device 101 is configured to not use second wireless communication (e.g., "S1 mode not requested") upon registration with the first network, the processor 500 may determine that the electronic device 101 does not support the second wireless communication. According to an embodiment, if the electronic device 101 is configured to use second wireless communication upon registration with the first network (e.g., "S1 mode requested"), the processor 500 may determine that the electronic device 101 supports the second wireless communication.

According to various embodiments, if the electronic device 101 does not support the second wireless communication (e.g., "No" in operation 1505), in operation 1507, an electronic device (e.g., the processor 120 or 500) may determine that the establishment of a communication link for the call connection with the external electronic device fails over a cellular network (e.g., the first network and/or the second network). According to an embodiment, if the first network does not support the call function and the electronic device 101 does not support the second wireless communication, the processor 500 may determine that the establishment of a communication link for the call connection with the external electronic device fails over a cellular network (e.g., the first network and/or the second network). The processor 500 may determine whether the call connection with the external electronic device is possible over the third network using third wireless communication (e.g., operation 607 in FIG. 6).

According to various embodiments, if the electronic device 101 supports the second wireless communication (e.g., "Yes" in operation 1505), in operation 1509, an electronic device (e.g., the processor 120 or 500) may perform a registration procedure with the second network using second wireless communication, based on the information related to the redirection and received from the first network. According to an embodiment, the processor 500 may control the first communication circuitry 510 to perform search (or a scan) related to the second wireless communication, based on frequency information that is included in the information related to the redirection (or IRAT handover) and received from the first network and that is related to the second wireless communication. The processor 500 may control the first communication circuitry 510 to register with the second network discovered through the search related to the second wireless communication.

According to various embodiments, an operating method of an electronic device (e.g., the electronic device 101 in FIG. 1, 2, 3, 4A, 4B, or 5) may include: an operation of registering with a network using new radio (NR) communication, an operation of identifying whether a call connection using a network using the wireless LAN communication is possible, when determining that the establishment of a communication link related to a call connection with an external electronic device using the network using the NR communication and/or a network using the LTE communication fails, and an operation of connecting a call with the external electronic device over the network using the wireless LAN communication, based on determining that the call connection using the network using the wireless LAN communication is possible.

According to various embodiments, the operation of registering with the NR network using the NR communication may include an operation of registering with the network using the NR communication based on a control message received over the network using the NR communication, and an operation of registering with an Internet protocol multimedia subsystem (IMS) server over the network using the NR communication.

According to various embodiments, the operating method may further include an operation of transmitting, to the network using the NR communication, a request signal related to the call connection with the external electronic device, and an operation of determining that the establishment of the communication link related to the call connection with the external electronic device using the network using the NR communication and/or the network using the LTE communication fails, based on determination that information related to handover of a protocol data unit (PDU) session and/or information related to a redirection is not received from the network using the NR communication for a designated time.

According to various embodiments, the operating method may further include an operation of performing a registration procedure with the network using the LTE communication based on the information related to the handover of the PDU session and/or the information related to the redirection received from the network using the NR communication, when the information related to the handover of the PDU session and/or the information related to the redirection are received from the network using the NR communication, and an operation of determining that the establishment of the communication link related to the call connection with the external electronic device using the network using the NR communication and/or the network using the LTE communication fails when the registration with the network using the LTE communication fails.

According to various embodiments, the operating method may further include an operation of performing search for the network using the LTE communication based on the information related to the handover of the PDU session and/or the information related to the redirection received from the network using the NR communication, when the information related to the handover of the PDU session and/or the information related to the redirection are received from the network using the NR communication, and an operation of determining that the establishment of the communication link related to the call connection with the external electronic device using the network using the NR communication and/or the network using the LTE communication fails when the search for the network using the LTE communication fails.

According to various embodiments, the operating method may further include an operation of searching for the network using the LTE communication based on the information related to the handover of the PDU session and/or the information related to the redirection received from the network using the NR communication, based on the information related to the handover of the PDU session and/or the information related to the redirection received from the network using the NR communication, and an operation of determining that the establishment of the communication link related to the call connection with the external electronic device using the network using the NR communication and/or the network using the LTE communication fails when the network using the LTE communication does not support a call function.

According to various embodiments, the operating method may further include an operation of registering with the network using the LTE communication based on the information related to the handover of the PDU session and/or the information related to the redirection received from the network using the NR communication, based on the information related to the handover of the PDU session and/or the information related to the redirection received from the network using the NR communication, and an operation of determining that the establishment of the communication link related to the call connection with the external electronic device using the network using the NR communication and/or the network using the LTE communication fails when the handover of the PDU session to the network using the LTE communication fails.

According to various embodiments, the operation of determining whether the call connection is possible may include an operation of identifying whether the call connection with the external electronic device using the network using the wireless LAN communication is possible, based on at least one of whether an address of an evolved packet data gateway (ePDG) is obtained, whether call context information related to an IMS server is valid, or signal quality of the network using the wireless LAN communication.

According to various embodiments, the operating method may further include an operation of determining that the call connection with the external electronic device using the network using the wireless LAN communication is possible, if the address of the ePDG is obtained, the call context information related to the IMS server is valid, and the signal quality of the network using the wireless LAN communication satisfies a designated condition.

According to various embodiments, the operation of connecting a call with the external electronic device may include an operation of performing handover of a protocol data unit (PDU) session to the network using the wireless LAN through an ePDG, based on determination that the call connection using the network using the wireless LAN communication is possible, an operation of re-registering with an IMS server over the network using the wireless LAN, and an operation of performing the call connection with the external electronic device over the network using the wireless LAN.

According to various embodiments of the disclosure, when an electronic device fails in the establishment of a communication link for a call connection with an external electronic device over a cellular network (e.g., an NR network and an LTE network), the electronic device connects a call with the external electronic device over a network using communication (e.g., wireless LAN) using an unlicensed band. Accordingly, a success rate of a call connection with an external electronic device can be effectively improved. Embodiments of the disclosure disclosed in this specification and the drawings have merely presented specific examples in order to easily describe technical contents according to the embodiments of the disclosure and to help understanding of the embodiments of the disclosure, but are not intended to limit the scope of the embodiments of the disclosure. Accordingly, all changes or modified forms derived based on the technical spirit of various embodiments of the disclosure should be construed as being included in the scope of various embodiments of the disclosure in addition to the embodiments disclosed herein.

The invention claimed is:

1. An electronic device comprising:
   memory storing instructions;
   first communication circuitry, which supports new radio (NR) communication and long term evolution (LTE) communication;
   second communication circuitry, which supports wireless local area network (LAN) communication; and
   at least one processor operatively connected to the first communication circuitry and the second communication circuitry,
   wherein the instructions, when executed by the at least one processor, cause the electronic device to:
      register with a network using the NR communication through the first communication circuitry,
      transmit, to the network using the NR communication, a request signal related to a call connection with an external electronic device based on occurrence of an event related to the request for the call connection with the external electronic device,
      perform a search related to the LTE communication using frequency information included in information related to a redirection received from the network using the NR communication in response to the request signal,
      when no network using the LTE communication is detected by the search related to the LTE communication, identify whether a call connection using a network using the wireless LAN communication is possible using at least one of whether an address of an evolved packet data gateway (ePDG) is obtained, whether call context information related to an internet protocol multimedia subsystem (IMS) server is valid, or signal quality of the network using the wireless LAN communication, and
      when the electronic device determines that the call connection with the external electronic device is possible through the network using the wireless LAN communication, connect a call with the external electronic device through the network using the wireless LAN communication.

2. The electronic device of claim 1, wherein the instructions, when executed by the at least one processor, cause the electronic device to:
   register with the network using the NR communication based on a control message received over the network using the NR communication, and
   register with the IMS server over the network using the NR communication.

3. The electronic device of claim 1, wherein the instructions, when executed by the at least one processor, cause the electronic device to determine that the call connection with the external electronic device using the network using the wireless LAN communication is possible, based on the address of the ePDG being obtained, the call context information related to the IMS server being valid, and the signal quality of the network using the wireless LAN communication satisfying a designated condition.

4. The electronic device of claim 1, wherein the instructions, when executed by the at least one processor, cause the electronic device to:
perform handover of a protocol data unit (PDU) session to the network using the wireless LAN through the ePDG, based on determining that the call connection using the network using the wireless LAN communication is possible,
re-register with the IMS server over the network using the wireless LAN, and
perform the call connection with the external electronic device over the network using the wireless LAN.

5. The electronic device of claim 1, wherein the instructions, when executed by the at least one processor, cause the electronic device to:
when the information related to the redirection is not received from the network using the NR communication for a designated time, identify whether a call connection using a network using the wireless LAN communication is possible using at least one of whether an address of an ePDG is obtained, whether call context information related to an IMS server is valid, or signal quality of the network using the wireless LAN communication.

6. The electronic device of claim 1, wherein the instructions, when executed by the at least one processor, cause the electronic device to:
when a network using the LTE communication is detected by the search related to the LTE communication, perform a registration procedure with the detected network using the LTE communication, and
when the registration procedure with the detected network using the LTE communication fails, identify whether a call connection using a network using the wireless LAN communication is possible using at least one of whether an address of an ePDG is obtained, whether call context information related to an IMS server is valid, or signal quality of the network using the wireless LAN communication.

7. The electronic device of claim 6, wherein the instructions, when executed by the at least one processor, cause the electronic device to:
when the electronic device is registered with the detected network using the LTE communication, identify whether the detected network using the LTE communication supports the call connection, and
when the detected network using the LTE communication does not support the call connection, identify whether a call connection using a network using the wireless LAN communication is possible using at least one of whether an address of an ePDG is obtained, whether call context information related to an IMS server is valid, or signal quality of the network using the wireless LAN communication.

8. An operating method of an electronic device, the method comprising:
registering with a network using new radio (NR) communication,
transmitting, to the network using the NR communication, a request signal related to a call connection with an external electronic device based on occurrence of an event related to the request for the call connection with the external electronic device,
performing a search related to a long term evolution (LTE) communication using frequency information included in information related to a redirection received from the network using the NR communication in response to the request signal,
when no network using the LTE communication is detected by the search related to the LTE communication, identifying whether a call connection using a network using a wireless local area network (LAN) communication is possible using at least one of whether an address of an evolved packet data gateway (ePDG) is obtained, whether call context information related to an internet protocol multimedia subsystem (IMS) server is valid, or signal quality of the network using the wireless LAN communication, and
when the electronic device determines that the call connection with the external electronic device is possible through the network using the wireless LAN communication, connecting a call with the external electronic device through the network using the wireless LAN communication, based on determining that the call connection using the network using the wireless LAN communication is possible.

9. The operating method of claim 8, wherein registering with the network using the NR communication comprises:
registering with the network using the NR communication based on a control message received over the network using the NR communication, and
registering with the IMS server over the network using the NR communication.

10. The operating method of claim 8, wherein connecting the call with the external electronic device comprises:
performing handover of a protocol data unit (PDU) session to the network using the wireless LAN through the ePDG, based on determining that the call connection using the network using the wireless LAN communication is possible,
re-registering with the IMS server over the network using the wireless LAN, and
performing the call connection with the external electronic device over the network using the wireless LAN.

11. The operating method of claim 8, further comprising:
when the information related to the redirection is not received from the network using the NR communication for a designated time, identifying whether a call connection using a network using the wireless LAN communication is possible using at least one of whether an address of an ePDG is obtained, whether call context information related to an IMS server is valid, or signal quality of the network using the wireless LAN communication.

12. The operating method of claim 8, further comprising:
when a network using the LTE communication is detected by the search related to the LTE communication, performing a registration procedure with the detected network using the LTE communication, and
when the registration procedure with the detected network using the LTE communication fails, identifying whether a call connection using a network using the wireless LAN communication is possible using at least one of whether an address of an ePDG is obtained, whether call context information related to an IMS server is valid, or signal quality of the network using the wireless LAN communication.

13. The operating method of claim 12, further comprising:
when the electronic device is registered with the detected network using the LTE communication, identifying whether the detected network using the LTE communication supports the call connection, and when the detected network using the LTE communication does not support the call connection, identifying whether a call connection using a network using the wireless LAN communication is possible using at least one of whether an address of an ePDG is obtained, whether call context information related to an IMS server is valid, or signal quality of the network using the wireless LAN communication.

* * * * *